US012749773B2

United States Patent
(12) United States Patent
Park et al.

(10) Patent No.: US 12,749,773 B2
(45) Date of Patent: Sep. 29, 2026

(54) BATTERY MODULE AND BATTERY PACK INCLUDING THE SAME

(71) Applicant: LG ENERGY SOLUTION, LTD., Seoul (KR)

(72) Inventors: Won Kyoung Park, Daejeon (KR); Junyeob Seong, Daejeon (KR); Myungki Park, Daejeon (KR); Samhoe Heo, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 719 days.

(21) Appl. No.: 18/025,360

(22) PCT Filed: Feb. 9, 2022

(86) PCT No.: PCT/KR2022/002004

§ 371 (c)(1),
(2) Date: Mar. 8, 2023

(87) PCT Pub. No.: WO2022/239934

PCT Pub. Date: Nov. 17, 2022

(65) Prior Publication Data

US 2023/0335866 A1 Oct. 19, 2023

(30) Foreign Application Priority Data

May 11, 2021 (KR) ........................ 10-2021-0060833

(51) Int. Cl.
*H01M 50/507* (2021.01)
*H01M 50/211* (2021.01)
(Continued)

(52) U.S. Cl.
CPC ....... *H01M 50/507* (2021.01); *H01M 50/211* (2021.01); *H01M 50/271* (2021.01);
(Continued)

(58) Field of Classification Search
None
See application file for complete search history.

(56) References Cited

U.S. PATENT DOCUMENTS 9,153,804 B2 10/2015 Kim et al.
2019/0061554 A1 2/2019 Brenner et al.
(Continued)

FOREIGN PATENT DOCUMENTS

CN 207116544 U 3/2018
CN 207818657 U 9/2018
(Continued)

OTHER PUBLICATIONS

Machine translation of WO 2020129338, Jun. 2020.*
(Continued)

*Primary Examiner* — Jonathan Crepeau
(74) *Attorney, Agent, or Firm* — Birch, Stewart, Kolasch & Birch, LLP

(57) ABSTRACT

A battery module includes a battery cell stack in which a plurality of battery cells are stacked in one direction, a module frame that houses the battery cell stack, a busbar that electrically connects the battery cell stack and an external member, a busbar frame that covers the front surface or rear surface of the battery cell stack and to which the busbar is attached, and an end plate that is coupled to the module frame and covers the busbar frame, wherein at least one opening is formed in the end plate. The protrusion of the busbar is exposed to the outside through the opening, and wherein a gap between the busbar protrusion and the opening is closed by a gasket.

12 Claims, 24 Drawing Sheets

(51) Int. Cl.
*H01M 50/271* (2021.01)
*H01M 50/291* (2021.01)
*H01M 50/296* (2021.01)
*H01M 50/503* (2021.01)

(52) U.S. Cl.
CPC ....... *H01M 50/291* (2021.01); *H01M 50/296* (2021.01); *H01M 50/503* (2021.01)

(56) References Cited

U.S. PATENT DOCUMENTS

| | | | |
|---|---|---|---|
| 2019/0109315 | A1 | 4/2019 | Hagino et al. |
| 2021/0098846 | A1 | 4/2021 | Min et al. |
| 2021/0164511 | A1 | 6/2021 | Jeong et al. |
| 2021/0226295 | A1 | 7/2021 | Kwon et al. |
| 2021/0296738 | A1 | 9/2021 | Lee et al. |
| 2021/0344074 | A1 | 11/2021 | Jung et al. |
| 2022/0216537 | A1 | 7/2022 | Choi et al. |
| 2022/0238937 | A1 | 7/2022 | Lee et al. |
| 2024/0063484 | A1 | 2/2024 | Jang et al. |
| 2025/0246696 | A1 | 7/2025 | You et al. |

FOREIGN PATENT DOCUMENTS

| | | | |
|---|---|---|---|
| CN | 208189652 | U | 12/2018 |
| CN | 109638215 | A | 4/2019 |
| CN | 209896150 | U | 1/2020 |
| CN | 111279516 | A | 6/2020 |
| CN | 111668419 | A | 9/2020 |
| CN | 111989799 | A | 11/2020 |
| CN | 112119532 | A | 12/2020 |
| CN | 112616323 | A | 4/2021 |
| EP | 4 246 707 | A1 | 9/2023 |
| JP | 2004-227928 | A | 8/2004 |
| JP | 2020-98689 | A | 6/2020 |
| KR | 10-2011-0127953 | A | 11/2011 |
| KR | 10-2018-0033023 | A | 4/2018 |
| KR | 10-1972422 | B1 | 4/2019 |
| KR | 10-2020-0080078 | A | 7/2020 |
| KR | 10-2020-0104143 | A | 9/2020 |
| KR | 10-2021-0037454 | A | 4/2021 |
| WO | WO 2019/037366 | A1 | 2/2019 |
| WO | WO 2019/148627 | A1 | 8/2019 |
| WO | WO 2020/129338 | A1 | 6/2020 |
| WO | WO 2021/002819 | A2 | 1/2021 |
| WO | WO 2021/071053 | A1 | 4/2021 |
| WO | WO 2021/080126 | A1 | 4/2021 |

OTHER PUBLICATIONS

International Search Report for PCT/KR2022/002004 mailed on Jun. 2, 2022.

Extended European Search Report for European Application No. 22807584.2, dated Oct. 1, 2024.

European Communication pursuant to Article 94(3) EPC for European Application No. 22 807 584.2, dated Dec. 8, 2025.

* cited by examiner

【FIG. 1】
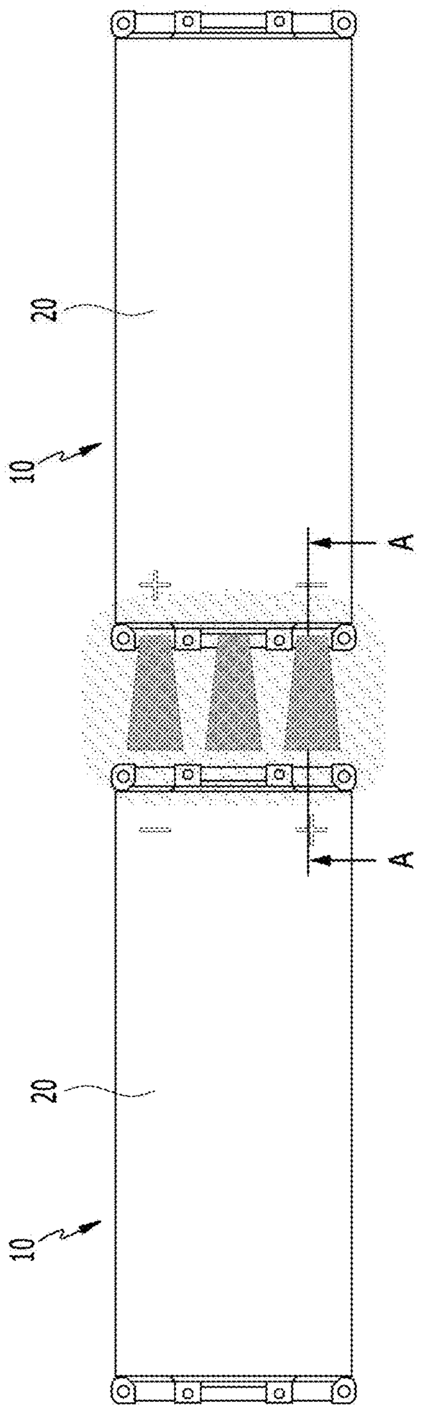
Conventional Art

【FIG. 2】
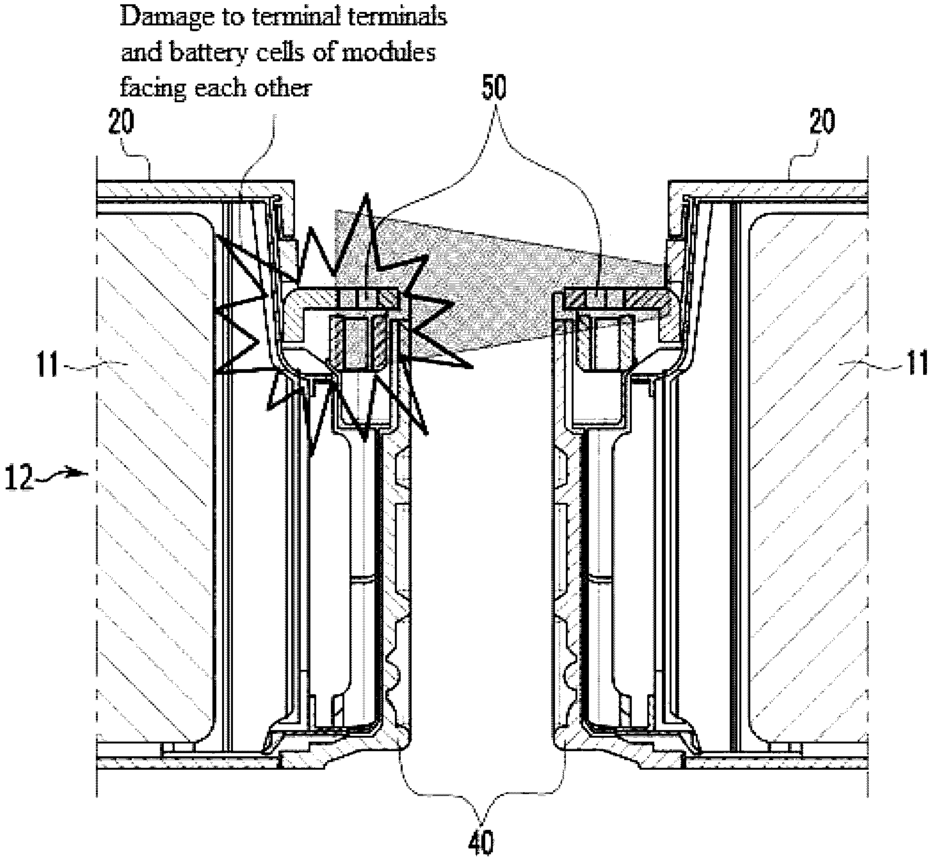

【FIG. 3】
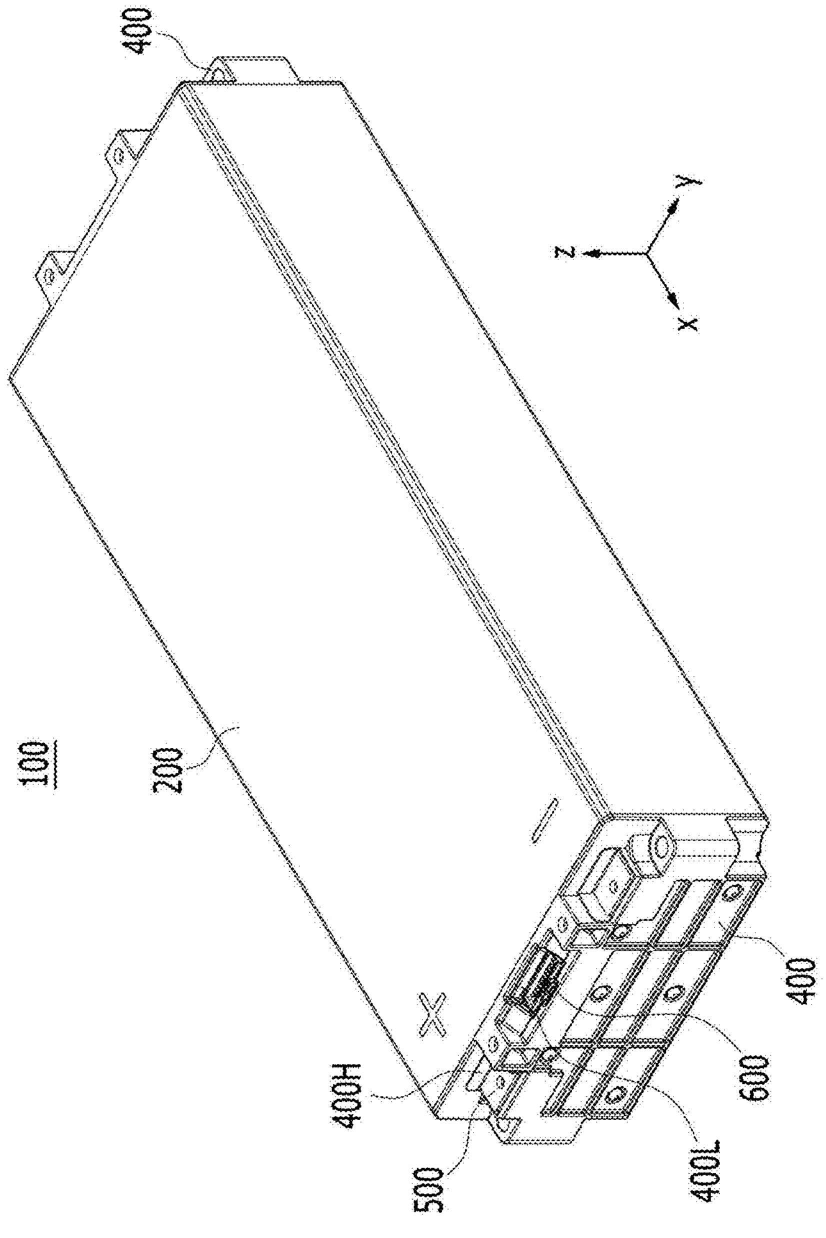

【FIG. 4】
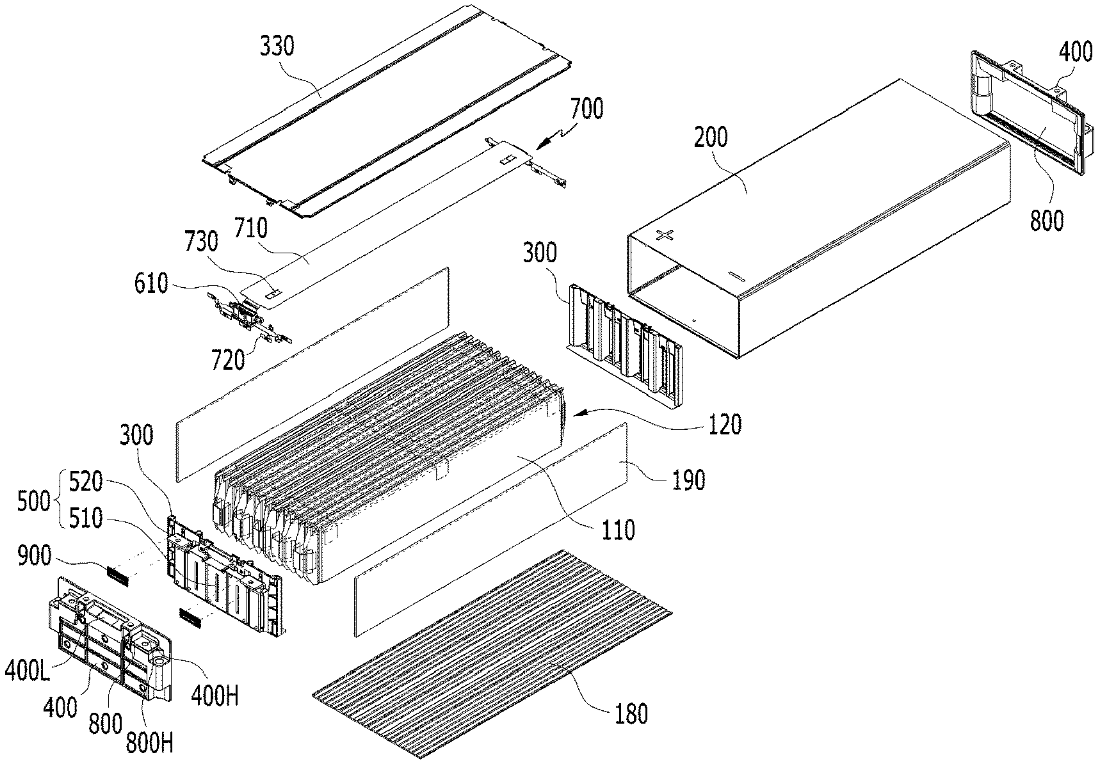
【FIG. 5】
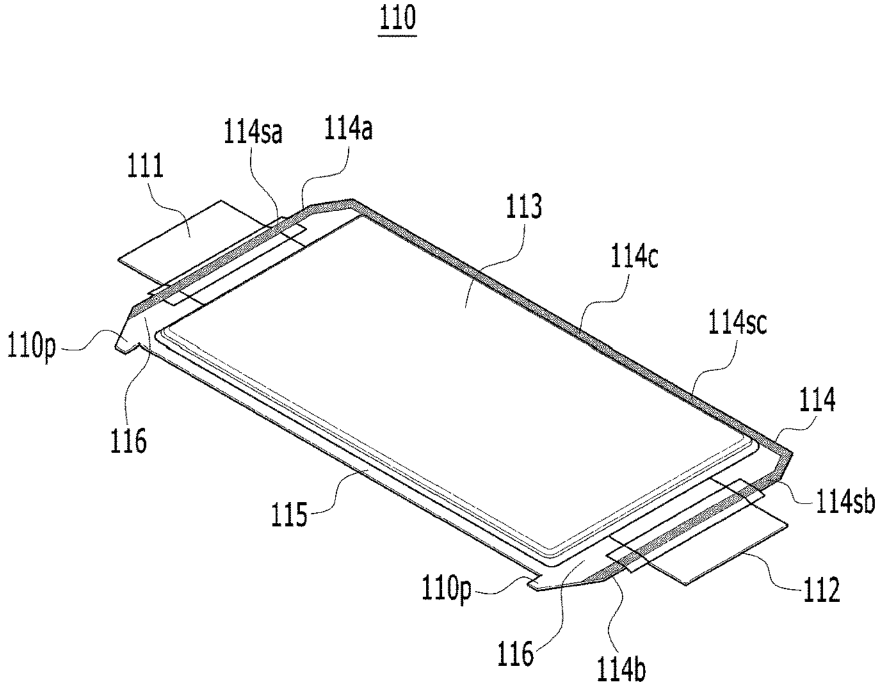

【FIG. 6】
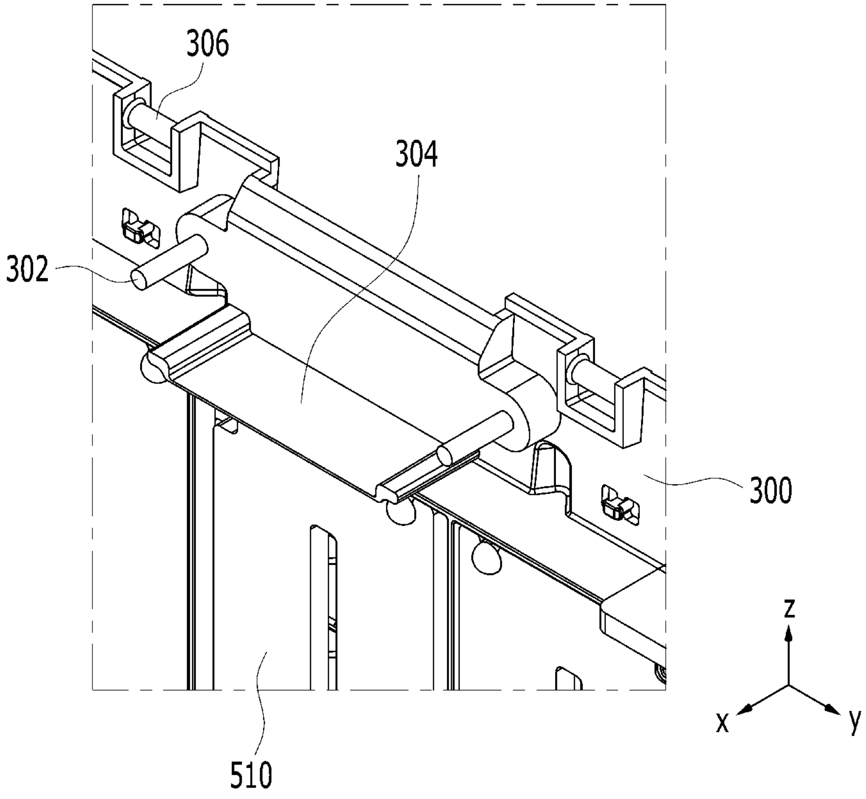

【FIG. 7】
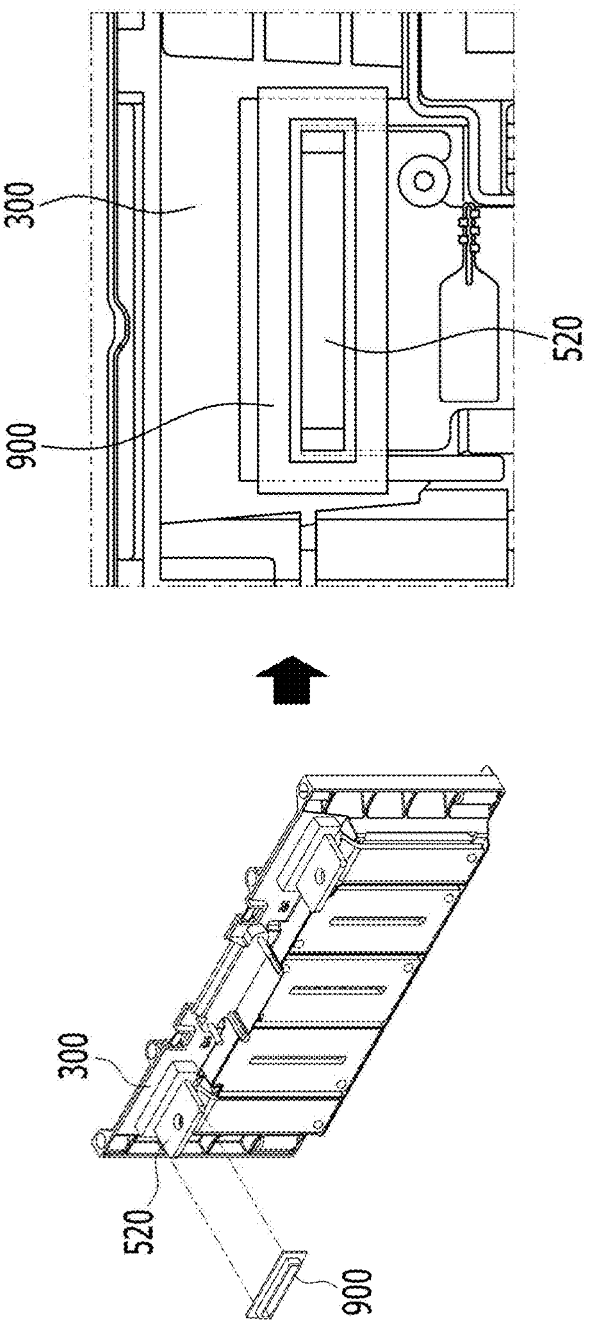

【FIG. 8】
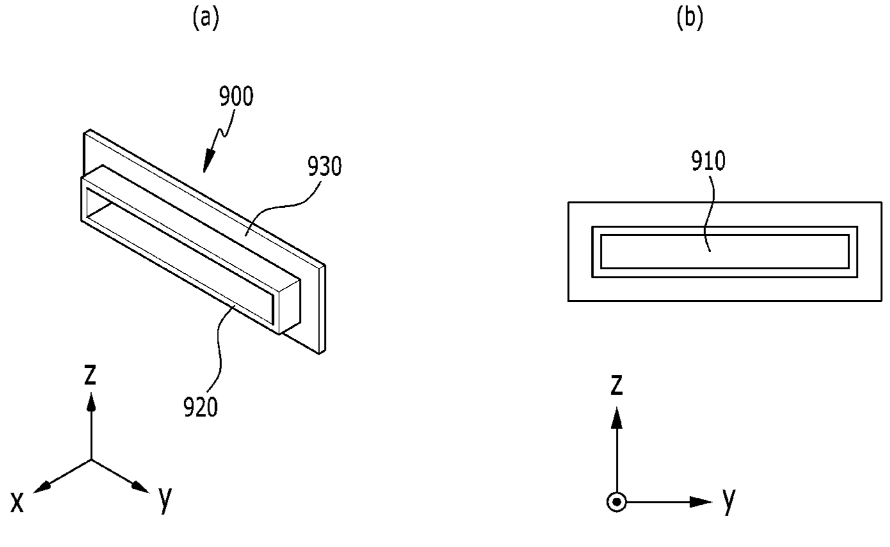

【FIG. 9】
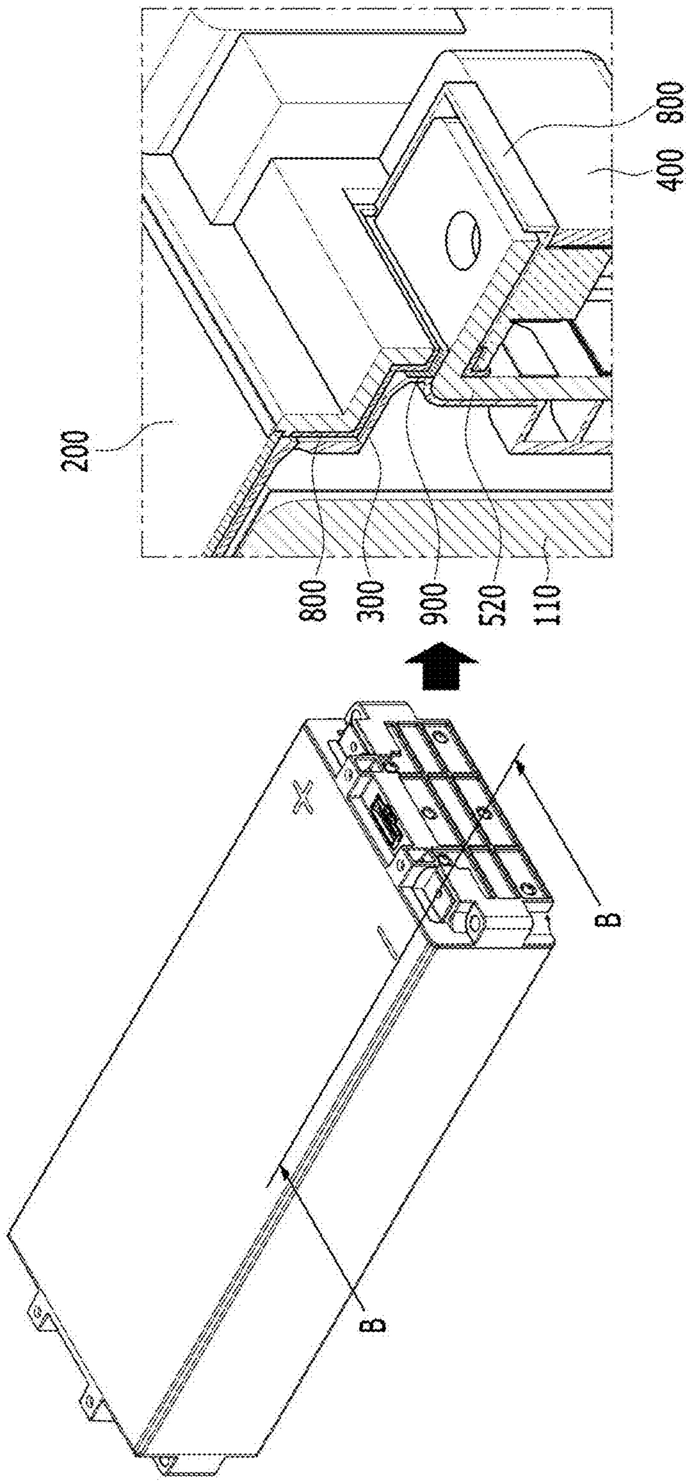

【FIG. 10】
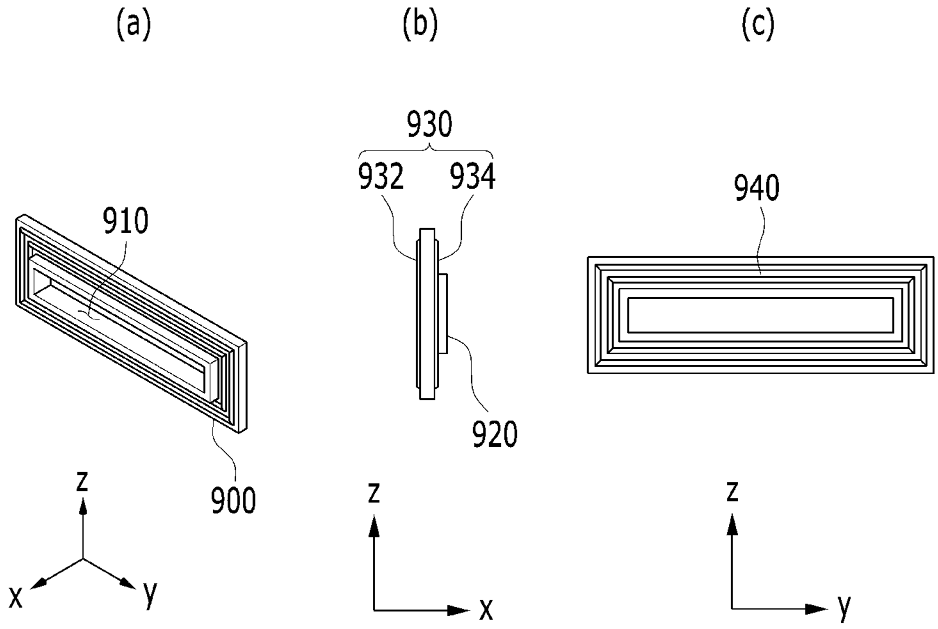

【FIG. 11】
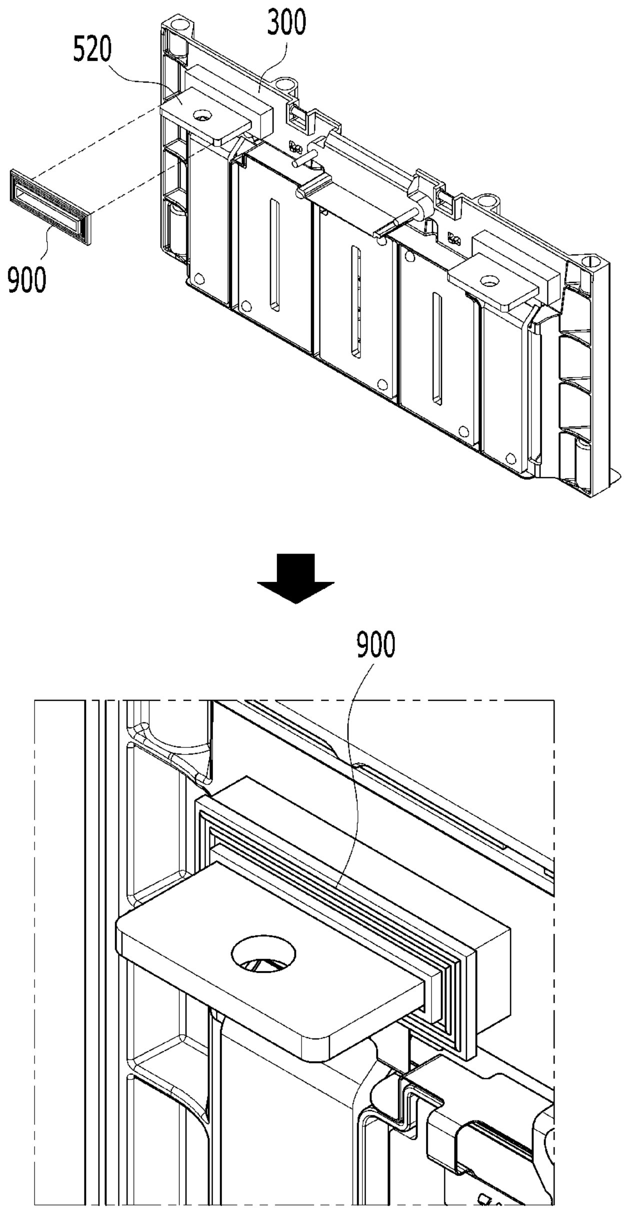

【FIG. 12】
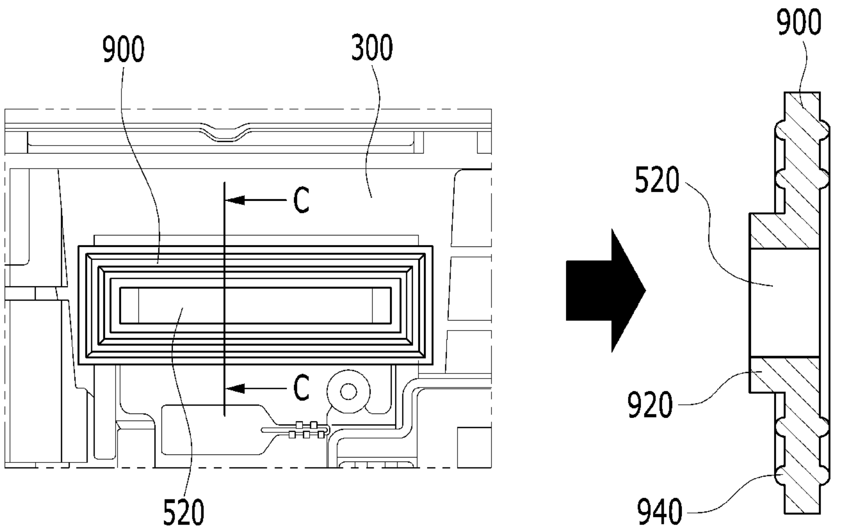

【FIG. 13】
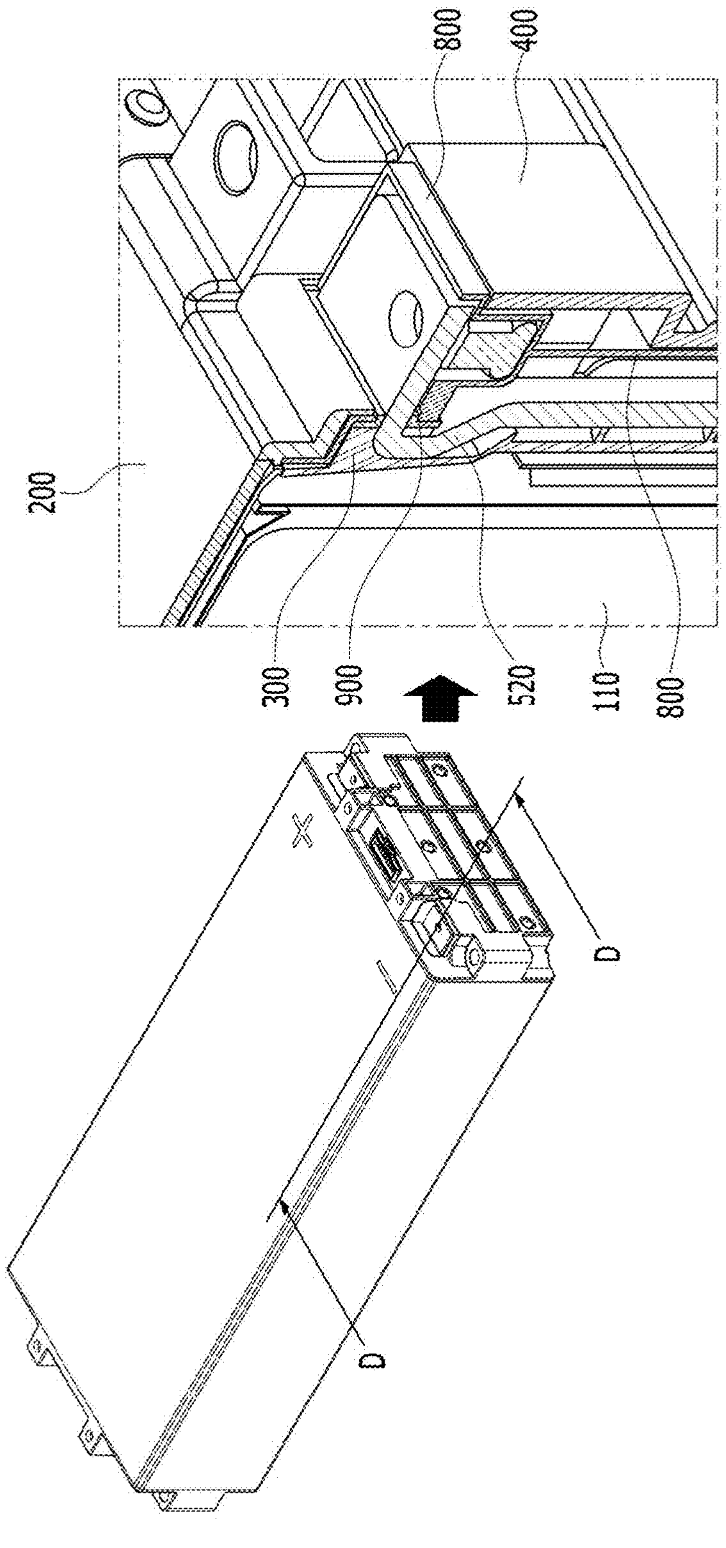

【FIG. 14】
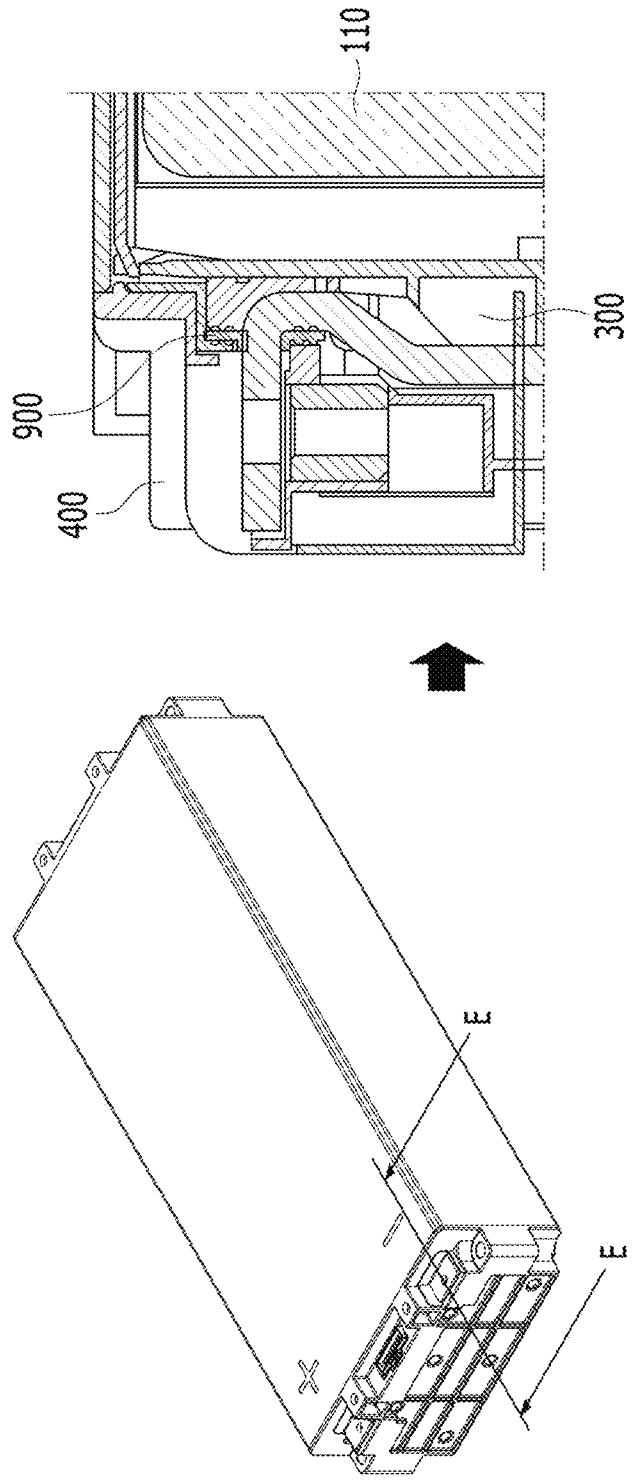

【FIG. 15】
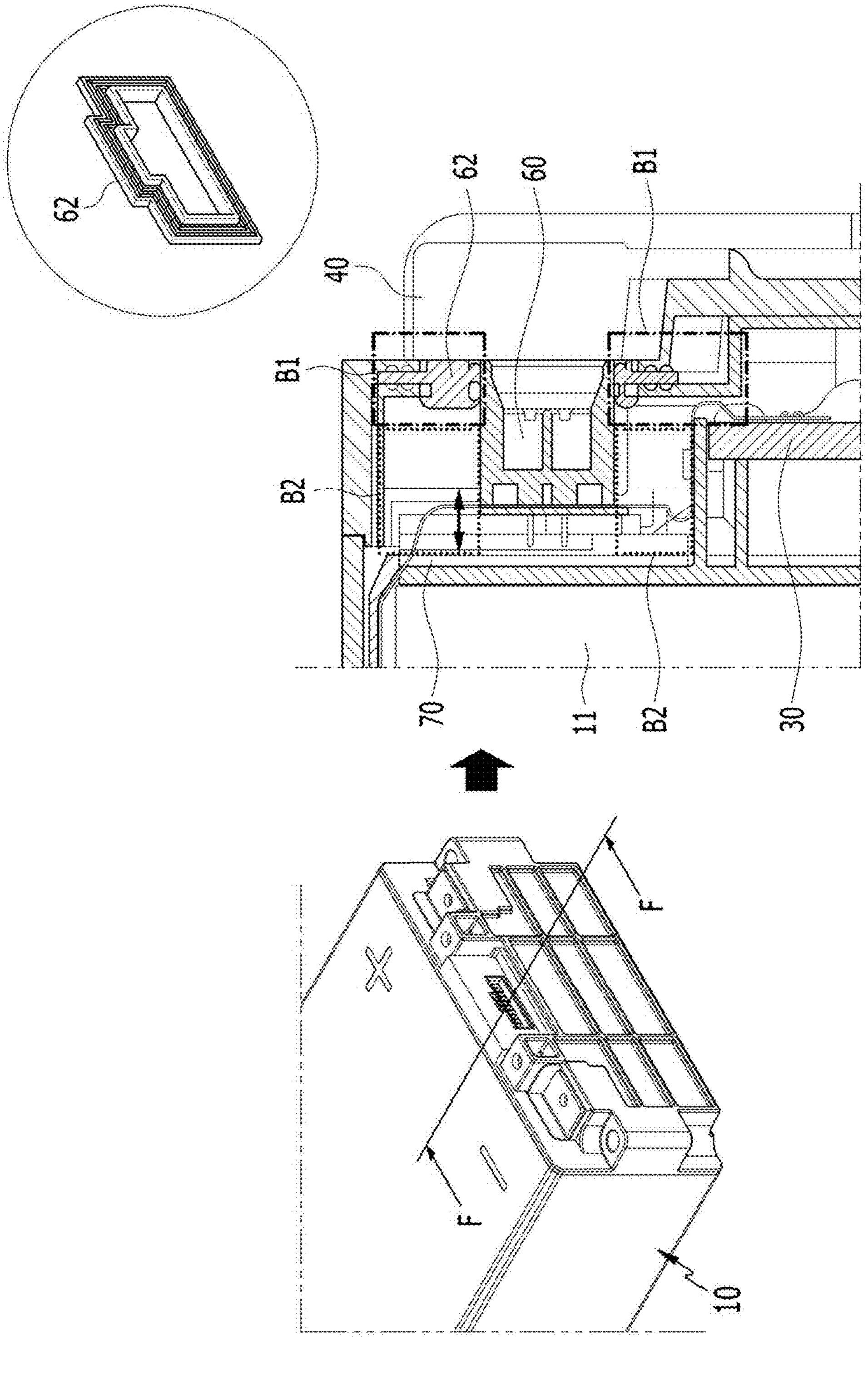
Conventional Art

【FIG. 16】
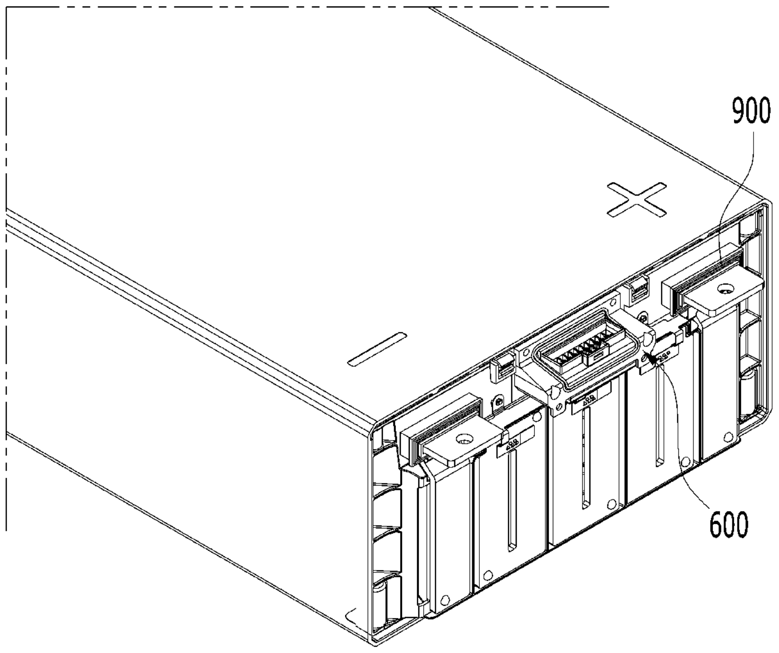

【FIG. 17】
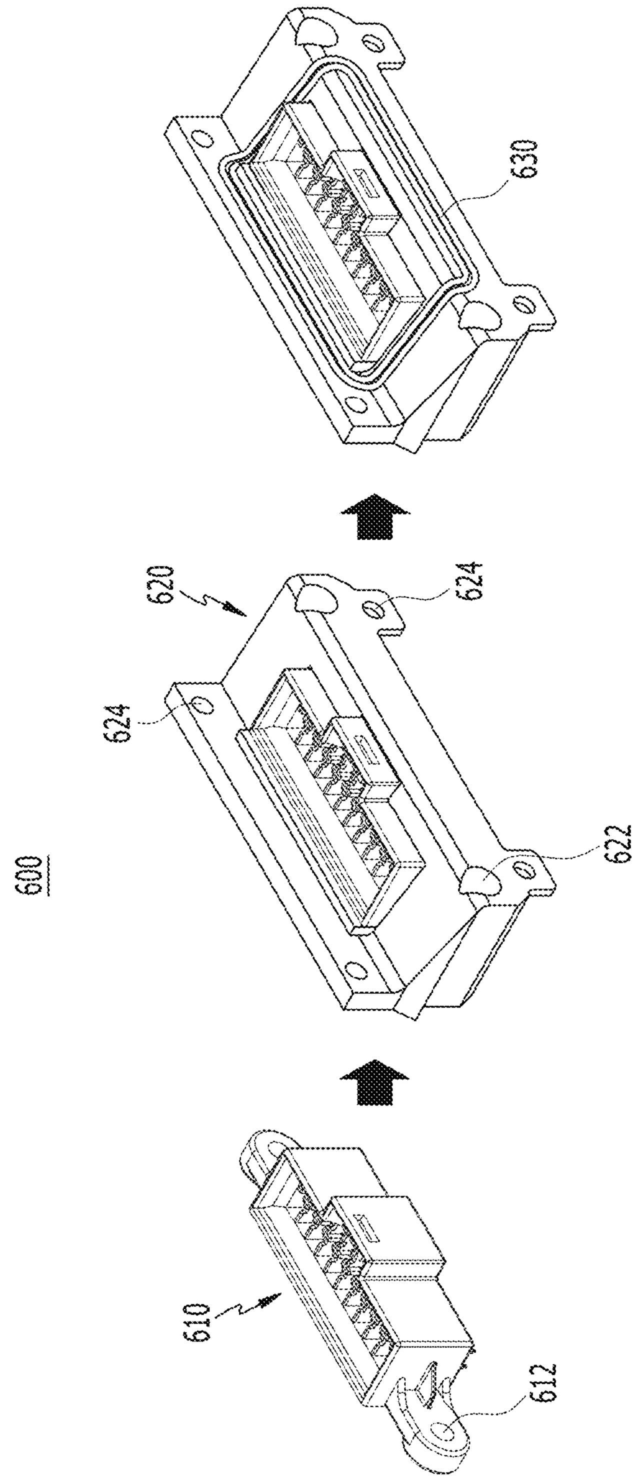

【FIG. 18】
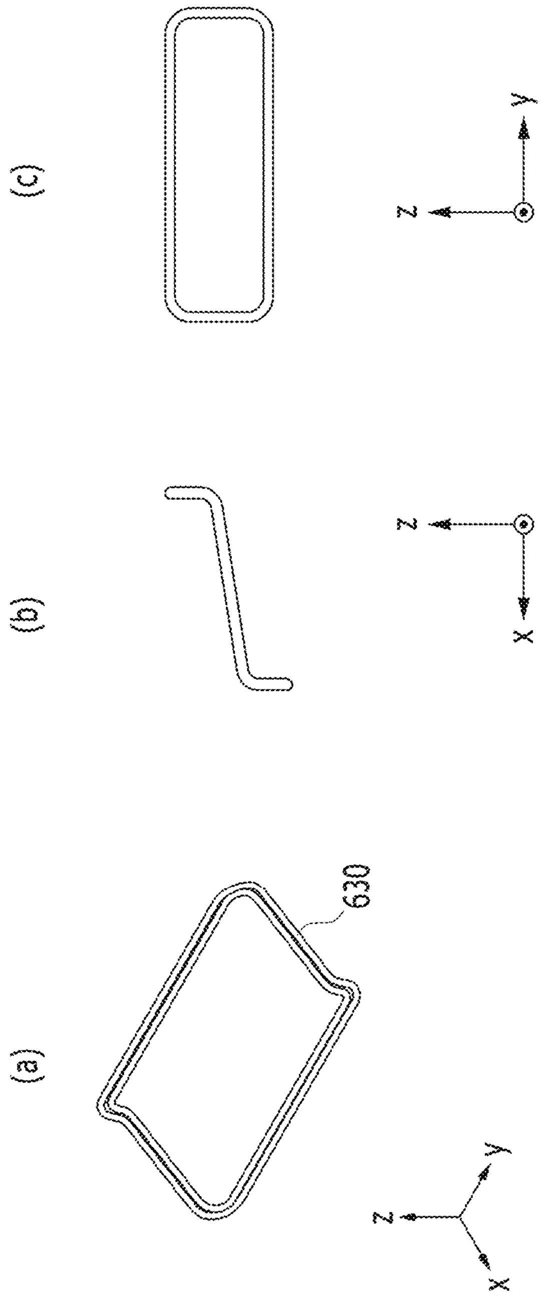

【FIG. 19】
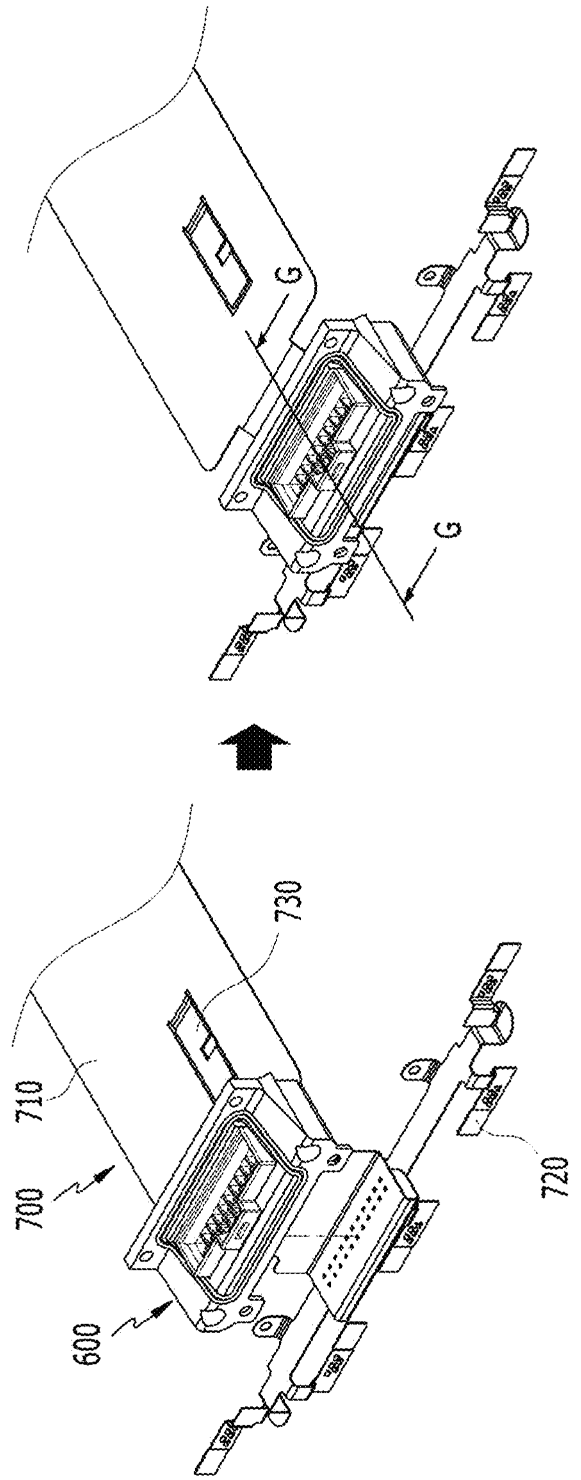

【FIG. 20】
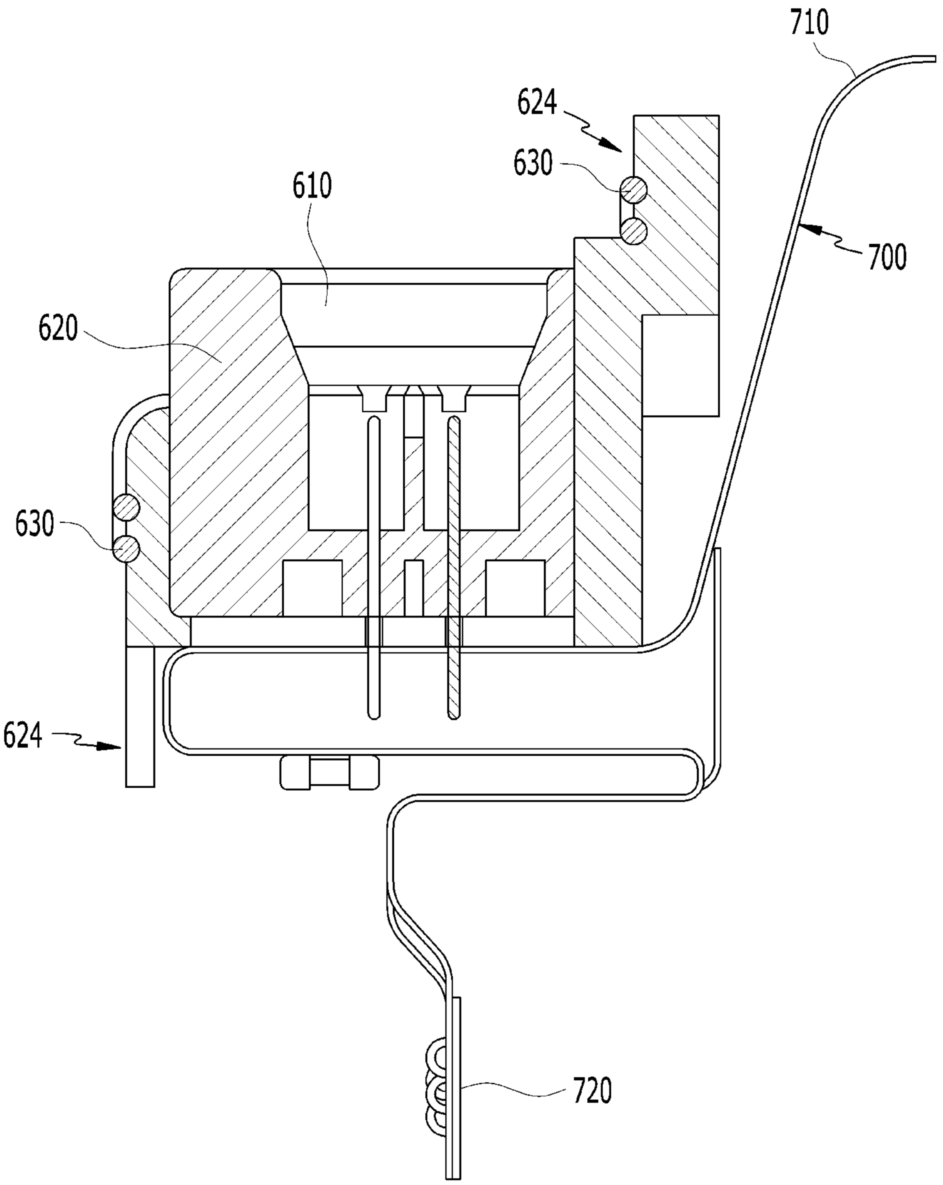

【FIG. 21】
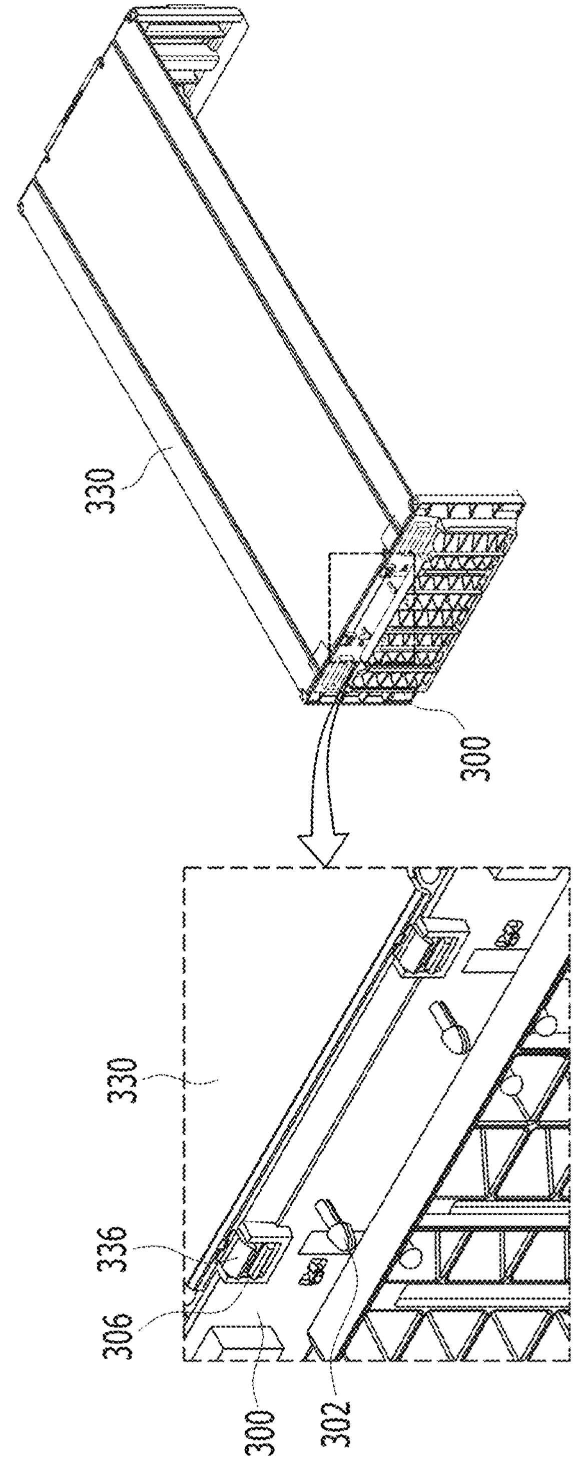

【FIG. 22】
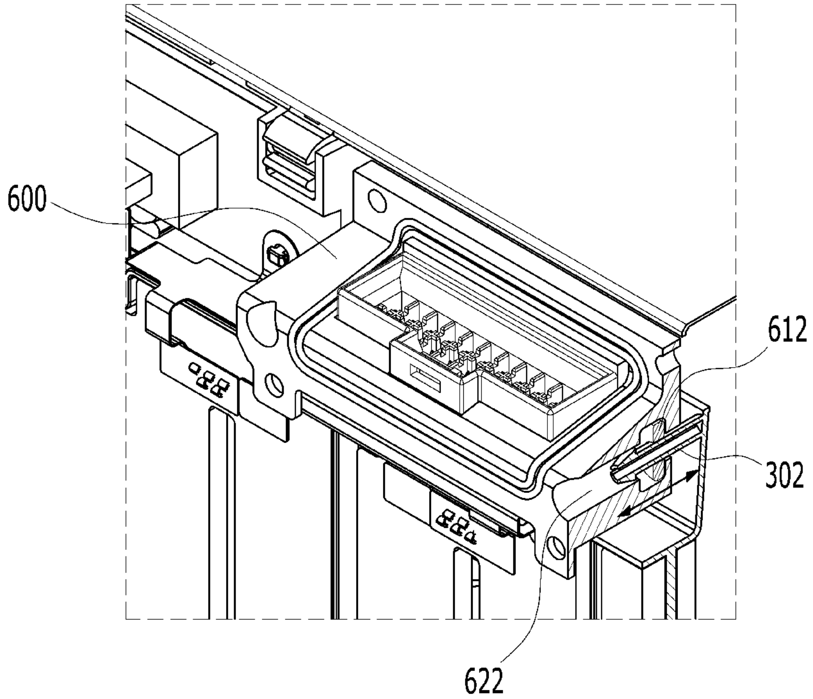

【FIG. 23】
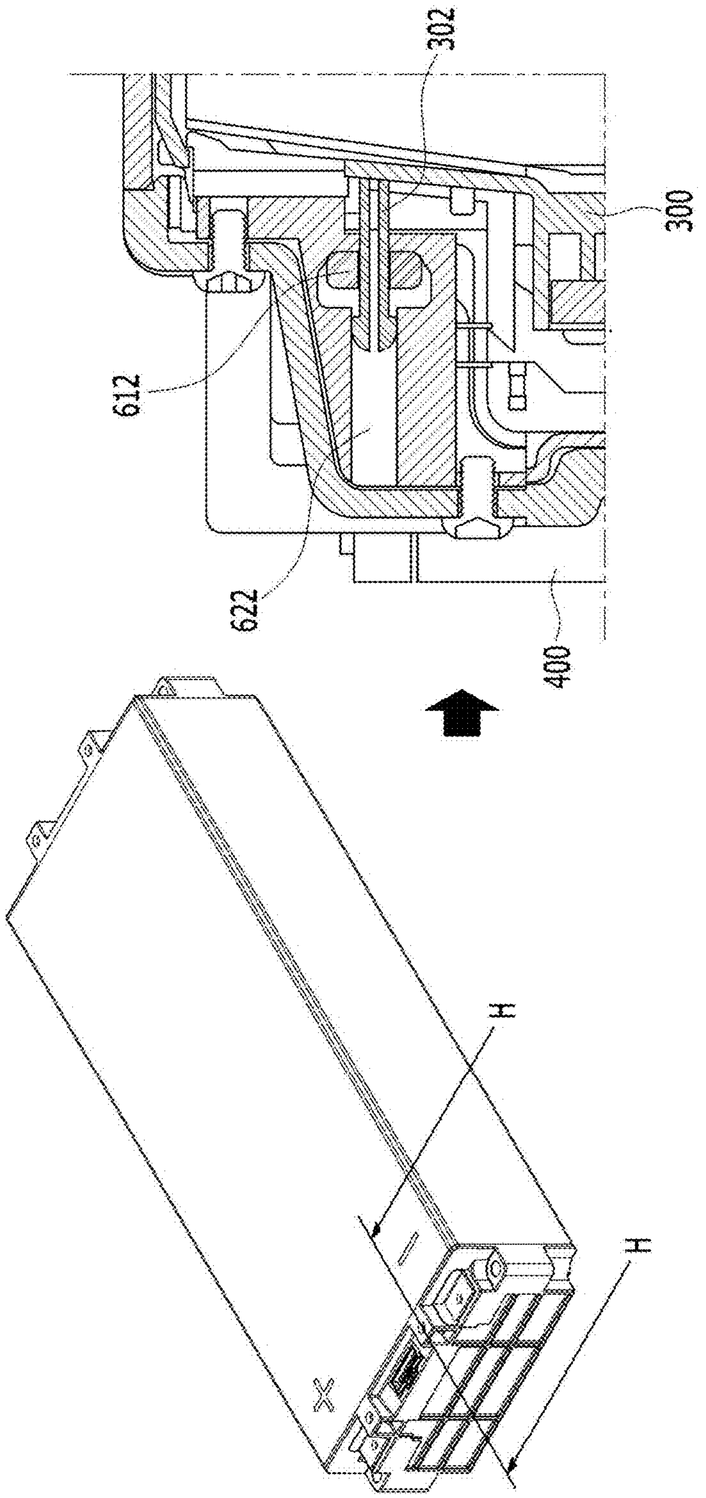

【FIG. 24】
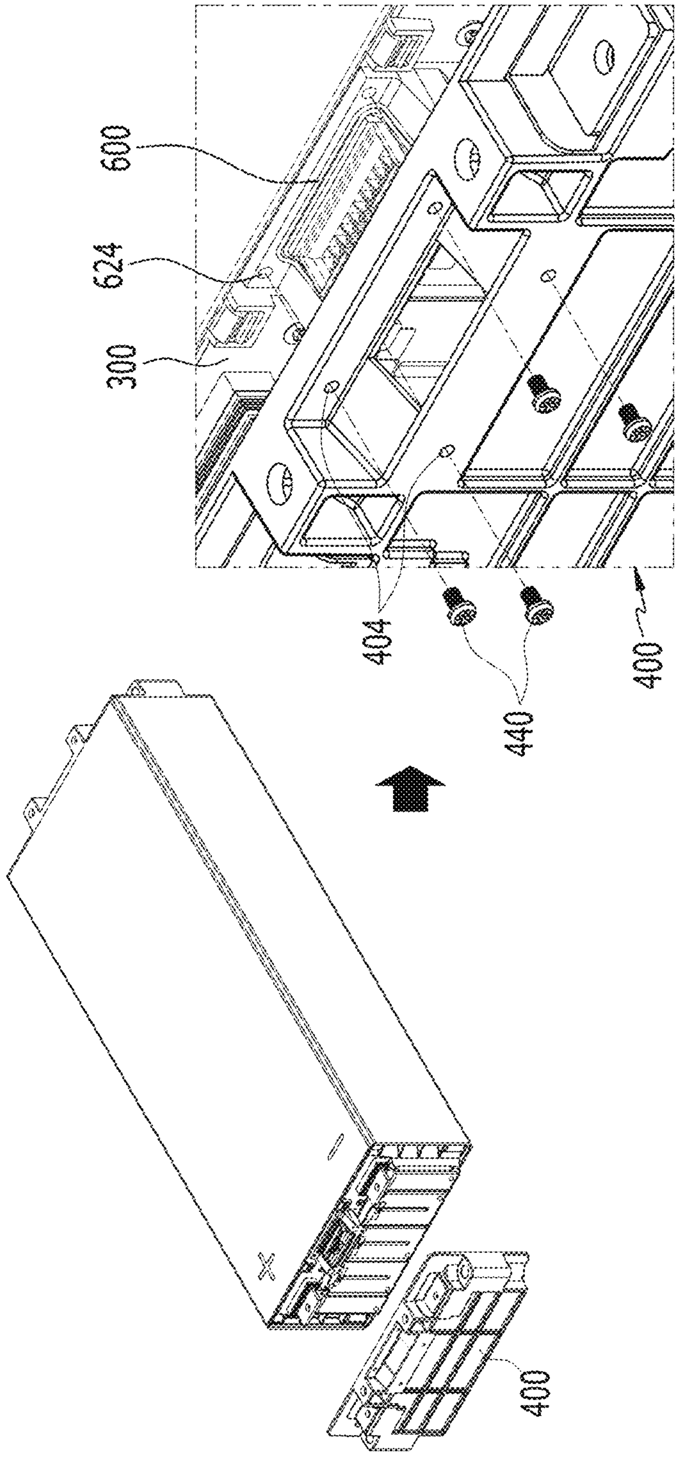

【FIG. 25】
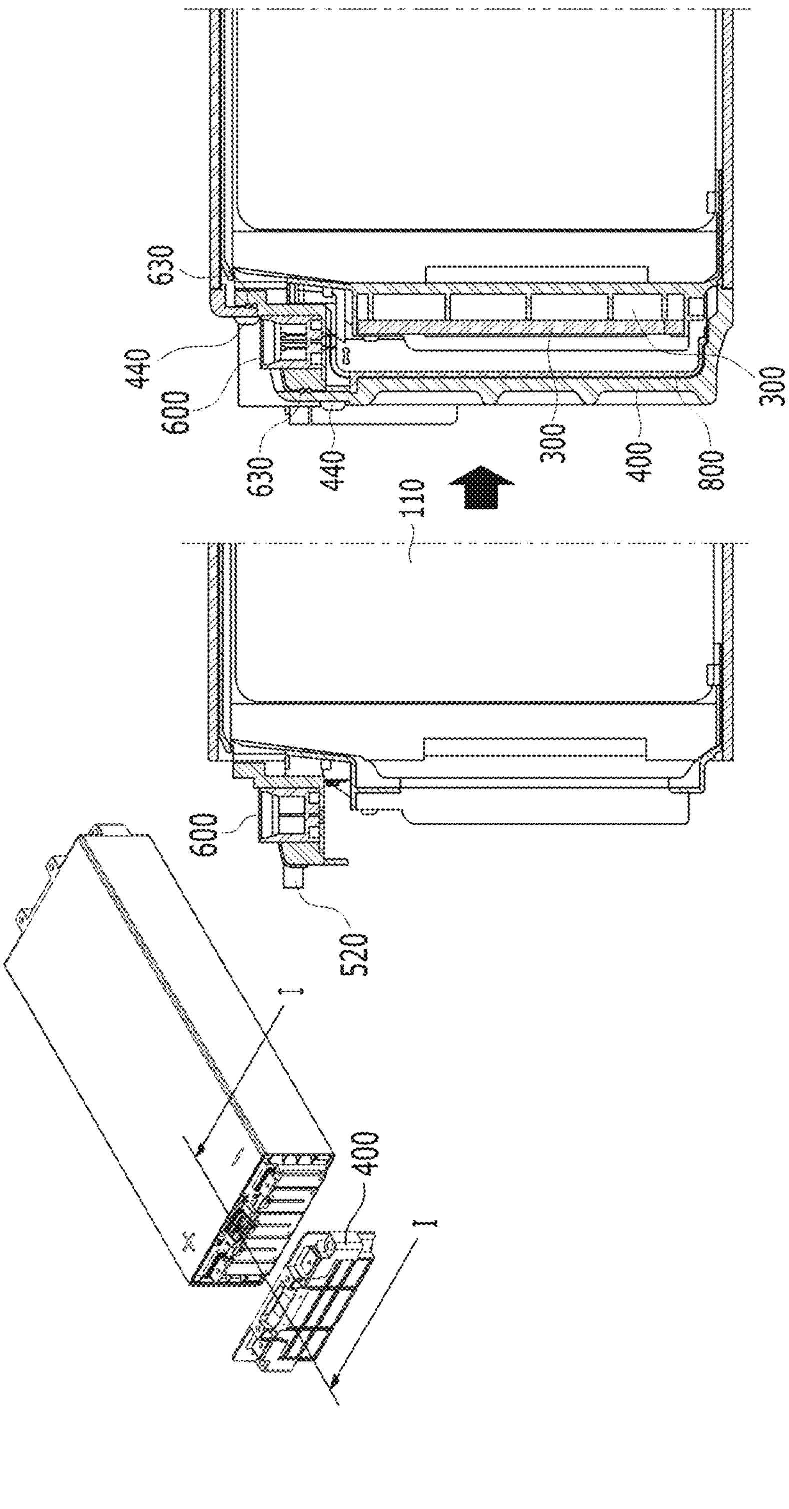

BATTERY MODULE AND BATTERY PACK INCLUDING THE SAME

CROSS CITATION WITH RELATED APPLICATION(S)

This application claims the benefit of Korean Patent Application No. 10-2021-0060833 filed on May 11, 2021 with the Korean Intellectual Property Office, the contents of which are incorporated herein by reference in their entirety.

TECHNICAL FIELD

The present disclosure relates to a battery module and a battery pack including the same, and more particularly, to a battery module with improved safety and a battery pack including the same.

BACKGROUND

Along with the increase of the technological development and demand for a mobile device, demand for a secondary battery as an energy source is increasing rapidly, and accordingly, many researches on the battery capable of meeting various demands are being performed.

A secondary battery has attracted considerable attention as an energy source for power-driven devices, such as an electric bicycle, an electric vehicle, and a hybrid electric vehicle, as well as an energy source for mobile devices, such as a mobile phone, a digital camera, and a laptop computer.

Recently, along with a continuous rise of the necessity for a large-capacity secondary battery structure, including the utilization of the secondary battery as an energy storage source, there is a growing demand for a battery pack of a multi-module structure which is an assembly of battery modules in which a plurality of secondary batteries are connected in series or in parallel.

Meanwhile, when a plurality of battery cells are connected in series or in parallel to configure a battery pack, a method of configuring a battery module composed of at least one battery cell and then adding other components to at least one battery module to configure a battery pack is common. Since the battery cells constituting these middle or large-sized battery modules are composed of chargeable/dischargeable secondary batteries, such a high-output and large-capacity secondary battery generates a large amount of heat in a charge and discharge process.

FIG. 1 is a diagram showing a state at the time of ignition of the battery module mounted on a conventional battery pack. FIG. 2 shows a section A-A of FIG. 1, which is a cross-sectional view showing the appearance of a flame that affects adjacent battery modules during ignition of a battery module mounted on a conventional battery pack.

Referring to FIGS. 1 and 2, the conventional battery module 10 includes a battery cell stack 12 in which a plurality of battery cells 11 are stacked, a module frame 20 that houses the battery cell stack 12, end plates 40 that are formed on the front and rear surfaces of the battery cell stack 12, a terminal busbar 50 formed so as to protrude out of the end plate, and the like.

The battery cell stack 12 may be located in a closed structure by coupling the module frame 20 and the end plate 40. Consequently, when the internal pressure of the battery cell 11 increases due to overcharging or the like, high-temperature heat, gas, or flame may be discharged to the outside of the battery cell 11, wherein the heat, gas, flame or the like discharged from one battery cell 11 may be transferred to other adjacent battery cells 11 at a narrow interval to induce a continuous ignition phenomenon. Additionally, the heat, gas, flame or the like discharged from each battery cell 11 may be discharged toward an opening formed in the end plate 40. In this process, there may be a problem that the busbar 50 or the like located between the end plate 40 and the battery cell 11 is damaged.

Moreover, the plurality of battery modules 10 in the battery pack are arranged such that at least two end plates 40 face each other, and thus, when heat, gas, flame or the like generated within the battery module 10 is discharged to the outside of the battery module 10, it may affect the performance and stability of the plurality of battery cells 11 in other adjacent battery modules 10.

Therefore, there is a need to design the battery module 10 that prevents the continuous thermal runaway phenomenon by preventing the heat, gas, or flame generated inside the battery module 10 from being discharged to the adjacent battery module 10.

DETAILED DESCRIPTION OF THE INVENTION

Technical Problem

It is an object of the present disclosure to provide a battery module with improved durability and safety by preventing a continuous thermal runaway phenomenon, and a battery pack including the same.

However, the technical problem to be solved by embodiments of the present disclosure is not limited to the above-described problems, and can be variously expanded within the scope of the technical idea included in the present disclosure.

Technical Solution

According to one aspect of the present disclosure, there is provided a battery module comprising: a battery cell stack in which a plurality of battery cells are stacked in a first direction, a module frame that houses the battery cell stack, a busbar that electrically connects the battery cell stack and an external member, a busbar frame that covers a front surface or a rear surface of the battery cell stack and to which the busbar is attached, and an end plate that is coupled to the module frame and covers the busbar frame, wherein at least one opening is formed in the end plate, wherein a busbar protrusion of the busbar is exposed to the outside through the at least one opening, and wherein a gap between the busbar protrusion and the at least one opening is closed by a gasket.

The gasket may include a gasket hole into which the busbar protrusion is inserted, and a lip part extending from a periphery of the gasket hole toward an exposure direction of the busbar protrusion, and an inner surface of the lip part may contact an outer periphery of the busbar protrusion, and an outer surface of the lip part may contact with the at least one opening.

The gasket may include a gasket hole into which the busbar protrusion is inserted, and a contact part extending outwardly from a periphery of the gasket hole, the contact part may include a first contact surface facing an inside of the battery module and a second contact surface facing an outside of the battery module, and the first contact surface may contact with an outer surface of the busbar frame.

The first contact surface or the second contact surface may be formed with a protrusion.

The protrusion may be a portion that protrudes from the first contact surface or the second contact surface toward an inside or an outside of the battery module.

The protrusion may have a concentric graphic pattern including a plurality of graphics radially separated from the gasket hole.

A height of the protrusion may be constant.

A height of the protrusion may gradually decrease in a direction extending away from the gasket.

The battery module may further comprises a module connector mounted on the busbar frame.

The busbar frame may include a holder, and the module connector may be connected to the holder of the busbar frame According to another aspect of the present disclosure, there is provided a battery pack comprising at least one battery module described above.

Advantageous Effects

According to embodiments of the present disclosure, by sealing the gap around the opening formed in the end plate of the battery module, it is possible to prevent a thermal runaway phenomenon occurring in one battery module from propagating to an adjacent battery module.

The effects of the present disclosure are not limited to the effects mentioned above and additional other effects not described above will be clearly understood from the description of the appended claims by those skilled in the art.

BRIEF DESCRIPTION OF THE DRAWINGS

FIG. 1 is a diagram showing a state at the time of ignition of the battery module mounted on a conventional battery pack;

FIG. 2 shows a section A-A of FIG. 1, which is a cross-sectional view showing the appearance of a flame that affects adjacent battery modules during ignition of a battery module mounted on a conventional battery pack;

FIG. 3 is a perspective view showing a battery module according to an embodiment of the present disclosure;

FIG. 4 is an exploded perspective view of the battery module of FIG. 3;

FIG. 5 is a perspective view of a battery cell included in the battery module of FIG. 3;

FIG. 6 is a perspective view of a busbar frame included in the battery module of FIG. 3;

FIGS. 7 to 9 are diagrams for explaining an example of a gasket included in a battery module according to an embodiment of the present disclosure;

FIG. 10 is a diagram of another example of a gasket included in a battery module according to an embodiment of the present disclosure;

FIGS. 11 and 12 are diagrams for explaining the coupling of the gasket and the busbar of FIG. 10;

FIGS. 13 and 14 are diagrams for explaining the coupling of the gasket and the end plate of FIG. 10;

FIG. 15 is a diagram for explaining a coupling structure of a module connector included in a conventional battery module;

FIG. 16 is a perspective view showing a battery module according to another embodiment of the present disclosure;

FIG. 17 is a perspective view of a connector assembly included in a battery module according to another embodiment of the present disclosure;

FIG. 18 is a diagram of a sealing member included in the connector assembly of FIG. 17;

FIG. 19 is a diagram for explaining the coupling of the connector assembly and the sensing unit included in the battery module according to an embodiment of the present disclosure;

FIG. 20 is a cross-sectional view taken along the line C-C of FIG. 19;

FIGS. 21 to 23 are diagrams for explaining the coupling of a connector assembly and a busbar frame included in a battery module according to another embodiment of the present disclosure; and FIGS. 24 and 25 are diagrams for explaining the coupling of the connector assembly and the end plate included in the battery module according to an embodiment of the present disclosure.

DETAILED DESCRIPTION OF THE EMBODIMENTS

Hereinafter, various embodiments of the present disclosure will be described in detail with reference to the accompanying drawings so that those skilled in the art can easily carry out them. The present disclosure can be modified in various different ways, and is not limited to the embodiments set forth herein.

Portions that are irrelevant to the description will be omitted to clearly describe the present disclosure, and like reference numerals designate like elements throughout the specification.

Further, in the drawings, the size and thickness of each element are arbitrarily illustrated for convenience of the description, and the present disclosure is not necessarily limited to those illustrated in the drawings. In the drawings, the thickness of layers, regions, etc. are exaggerated for clarity. In the drawings, for convenience of the description, the thicknesses of some layers and regions are exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed "on" or "above" the reference portion toward the opposite direction of gravity. Meanwhile, similar to the case where it is described as being located "on" or "above" another part, the case where it is described as being located "below" or "under" another part will also be understood with reference to the above-mentioned contents.

Further, throughout the specification, when a portion is referred to as "including" or "comprising" a certain component, it means that the portion can further include other components, without excluding the other components, unless otherwise stated.

Further, throughout the specification, when referred to as "planar", it means when a target portion is viewed from the upper side, and when referred to as "cross-sectional", it means when a target portion is viewed from the side of a cross section cut vertically.

Now, a battery module according to an embodiment of the present disclosure will be described.

FIG. 3 is a perspective view showing a battery module according to an embodiment of the present disclosure. FIG. 4 is an exploded perspective view of the battery module of FIG. 3. FIG. 5 is a perspective view of a battery cell included in the battery module of FIG. 3. FIG. 6 is a perspective view of a busbar frame included in the battery module of FIG. 3.

Referring to FIGS. 3 and 4, the battery module 100 according to an embodiment of the present disclosure includes a battery cell stack 120 in which a plurality of battery cells 110 are stacked in one direction, a module frame 200 that houses the battery cell stack 120, a busbar frame 300 that is located on the front surface and/or rear surface of the battery cell stack 120, end plates 400 that cover the front surface and/or rear surface of the battery cell stack 120, busbars 510 and 520 and a module connector 610 that are mounted on the busbar frame 300, and a sensing unit 700.

The battery cells 110 may be provided in a pouch shape that can maximize the number of stacked cells per unit area. The battery cell 110 provided in the pouch shape can be manufactured by housing an electrode assembly including a positive electrode, a negative electrode, and a separator in a cell case 114 of a laminate sheet and then heat-sealing the sealing part of the cell case 114. However, it will be obvious that the battery cell 110 need not be essentially provided in a pouch shape, and can be provided in a square, cylindrical, or various other forms, at a level where the storage capacity required by the device to be mounted in the future is achieved.

Referring to FIG. 5, the battery cell 110 may include two electrode leads 111 and 112. The electrode leads 111 and 112 may have a structure protruding from one end of the cell main body 113, respectively. Specifically, one end of respective electrode leads 111 and 112 is located inside the battery cell 110 and thus is electrically connected to the positive electrode or negative electrode of the electrode assembly. The other end of the respective electrode leads 111 and 112 is protruded to the outside of the battery cell 110, and thus can be electrically connected with a separate member, for example, the busbars 510 and 520.

The electrode assembly in the cell case 114 can be sealed by the sealing parts 114*sa*, 114*sb* and 114*sc*. The sealing parts 114*sa*, 114*sb* and 114*sc* of the cell case 114 may be located on both end parts 114*a* and 114*b* and one side part 114*c* connecting them.

The cell case 114 is generally formed of a laminate structure of a resin layer/metallic thin film layer/resin layer. For example, a surface of the cell case formed of an O (oriented)-nylon layer tends to slide easily by an external impact when a plurality of battery cells 110 are stacked to form a medium- or large-sized battery module 100. Therefore, in order to prevent this sliding and maintain a stable stacking structure of the battery cells 110, an adhesive member, for example, a sticky adhesive such as a double-sided tape or a chemical adhesive coupled by a chemical reaction upon adhesion, can be adhered to the surface of the cell case 114 to form a battery cell stack 120.

The connection part 115 may refer to a region extending along the longitudinal direction at one end of the cell case 114 in which the above-mentioned sealing parts 114*sa*, 114*sb* and 114*sc* are not located. A protrusion part 110*p* of the battery cell 110 called a bat-ear may be formed at an end part of the connection part 115. Further, the terrace part 116 may refer to a region between electrode leads 111 and 112 in which a part protrudes to the outside of the cell case 114, and the cell main body 113 located inside the cell case 114, on the basis of the edge of the cell case 114.

Meanwhile, the battery cell 110 provided in the pouch type may have a length, a width and a thickness, and the longitudinal direction, the width direction, and the thickness direction of the battery cell 110 may be perpendicular to each other.

Here, the longitudinal direction of the battery cell 110 may be defined according to the direction in which the electrode leads 111 and 112 protrude from the cell case 114. The longitudinal direction of the battery cell 110 may be defined as an x-axis direction or a −x-axis direction.

Also, the width direction of the battery cell 110 herein may be a z-axis direction or a −z-axis direction from one side part 114*c* of battery cell 110 to a connection part 115 or from the connection part 115 to the one side part 114*c* of the battery cell 110 as shown in FIG. 4. Further, the thickness direction of the battery cell 110 herein may be defined as a y-axis direction or a −y-axis direction perpendicular to the width direction and the length direction.

The battery cell stack 120 may be one in which a plurality of electrically connected battery cells 110 are stacked along one direction. A direction in which the plurality of battery cells 110 are stacked (hereinafter referred to as a 'stacking direction') may be a y-axis direction as shown in FIGS. 3 and 4 (or it may be a −y-axis direction, and in the following, the expression 'axial direction' may be interpreted as including all +/− directions).

A direction in which the battery cell stack 120 heads from the front surface to the rear surface, or a backward direction thereof may be defined as the longitudinal direction of the battery cell stack 120, which may be an x-axis direction. Further, a direction in which the battery cell stack 120 heads from the upper surface to the lower surface, or a backward direction thereof may be defined as the width direction of the battery cell stack 120, which may be a z-axis direction.

The longitudinal direction of the battery cell stack 120 may be substantially the same as the longitudinal direction of the battery cells 110. At this time, the electrode leads 111 and 112 of the battery cells 110 may be located on the front surface and rear surface of the battery cell stack 120. At this time, the busbars 510 and 520 of the battery module 100 may be arranged close to the front surface and rear surface of the battery cell stack 120 so as to easily form an electrical connection between the electrode leads 111 and 112.

The module frame 200 can be for protecting the battery cell stack 120 and the electrical components connected thereto from external physical impacts. The module frame 200 may be housed in the internal space of the battery cell stack 120 and the electric device module frame 200 connected thereto. Here, the module frame 200 includes an inner surface and an outer surface, and the inner space of the module frame 200 may be defined by the inner surface.

The structure of the module frame 200 may be various. In one example, the structure of the module frame 200 can be a structure of a mono frame. Here, the mono frame may be in a metal plate shape in which the upper surface, the lower surface and both side surfaces are integrated. The mono frame can be manufactured by extrusion molding. In another example, the structure of the module frame 200 may be a structure in which a U-shaped frame and an upper plate (upper surface) are combined. In the case of a structure in which the U-shaped frame and the upper plate are combined, the structure of the module frame 200 may be formed by coupling the upper plate to the upper side surfaces of the U-shaped frame, which is a metal plate in which the lower surface and both sides are combined or integrated. Each frame or plate can be manufactured by press molding. Further, the structure of the module frame 200 can be provided in the structure of an L-shaped frame in addition to the mono frame or the U-shaped frame, and may be provided in various structures not described in the above-mentioned examples.

The structure of the module frame 200 may be provided in a shape that is opened along the longitudinal direction of the battery cell stack 120. The electrode leads 111 and 112 of the battery cell 110 may not be hidden by the module frame 200. The front and rear surfaces of the battery cell stack 120 may not be hidden by the module frame 200. The front surface and rear surface of the battery cell stack 120 may be hidden by the busbar frame 300, the end plate 400, the busbars 510 and 520, or the like, which will be described later. Thereby, the front surface and rear surface of the battery cell stack 120 may be protected from external physical impacts and the like.

Meanwhile, a heat conductive member 180 may be provided between the battery cell stack 120 and the inner surface of the module frame 200. The heat conductive member 180 may be for discharging/transmitting heat generated in the battery cell 110 to the outside via the module frame 200. The heat conductive member 180 may be formed of a material having excellent thermal conductivity. The heat conductive member 180 may include an adhesive material. For example, the heat conductive member 180 may include at least one of a silicone-based material, a urethane-based material, and an acrylic-based material.

The heat conductive member 180 may be formed by injecting a heat conductive resin between the battery cell stack 120 and one side surface of the inner surfaces of the module frame 200. However, this is not always the case, and the heat conductive member 180 may be a plate-shaped member. The heat conductive member 180 may be located on the z-axis of the battery cell stack 120, and the heat conductive member 180 may be located between the battery cell stack 120 and the bottom surface (or may be referred to as a bottom part) of the module frame 200.

Further, a compression pad 190 may be located between the battery cell stack 120 and one side surface of the inner surface of the module frame 200. At this time, the compression pad 190 may be located on a surface on the y-axis of the battery cell stack 120, and may face at least one surface of the two battery cells 110 at both ends of the battery cell stack 120.

The busbar frame 300 can be located on one surface of the battery cell stack 120 to cover one surface of the battery cell stack 120 and, at the same time, guide the connection between the battery cell stack 120 and an external device. The busbar frame 300 may be located on the front surface or rear surface of the battery cell stack 120. At least one of the busbars 510 and 520 and the module connector 610 may be mounted on the busbar frame 300. As a specific example, referring to FIGS. 3 and 4, one surface of the busbar frame 300 is connected with the front surface or rear surface of the battery cell stack 120, and the other surface of the busbar frame 300 may be connected with the busbars 510 and 520 and the module connector 610. Further, as shown in FIG. 6, the busbar frame 300 may be formed with a holder 302 and a support 304 for connecting with the module connector 610.

The busbar frame 300 may include an electrically insulating material. The busbar frame 300 may restrict the busbars 510 and 520 from making contact with other parts of the battery cells 110, except the parts where they are joined to the electrode leads 111 and 112, and may prevent the occurrence of an electrical short circuit.

The busbar frame 300 may be formed in two numbers, and may include a first busbar frame (may be referred to as reference number 300) located on the front surface of the battery cell stack 120 and a second busbar frame (not shown) located on the rear surface of the battery cell stack 120.

The busbar frame 300 may be coupled to the upper cover 330 to form a busbar assembly. The upper cover 330 may cover the portion with a size corresponding to the upper surface of the battery cell stack 120. In the process of housing the battery cell stack 120 inside the module frame 200, the upper cover 330 can protect the sensing unit 700 and the like.

Both ends of the upper cover 330 in the longitudinal direction may be coupled to the busbar frame 300. A slit 306 may be formed in an upper part of the busbar frame 300, and a locking part 336 (see FIG. 21) may be formed at both ends of the upper cover 330 in the longitudinal direction. One end of the locking part 336 may be inserted so that the locking part 336 and the slit 306 can be fastened. The locking part 336 may have a U-shape or V-shape, and the upper end of the busbar frame 300 may be located inside the U-shaped bend. Locking jaws protruding toward each other are formed at both ends of the U-shape of the locking part 336, and the locking jaw can prevent the locking part 336 from being disassembled from the slit 306 after being fastened with the slit 306. Meanwhile, the above-mentioned coupling of the slit 306 and the locking part 336 may be a fluid type coupling, and the busbar frame 300 may be rotatably coupled to the upper cover 330 through the slit 306 and the locking part 336.

The end plate 400 can be for protecting the battery cell stack 120 and electrical equipment connected thereto from external physical impacts by sealing the opened surface of the module frame 200. For this purpose, the end plate 400 may be made of a material having a predetermined strength. For example, the end plate 400 may include a metal such as aluminum.

The end plate 400 may be coupled (joined, sealed or closed) to the module frame 200 while covering the busbar frame 300 or the busbars 510 and 520 located on one surface of the battery cell stack 120. Each edge of the end plate 400 can be coupled to a corresponding edge of the module frame 200 by a method such as welding.

An insulation cover 800 for electrical insulation may be located between the end plate 400 and the busbar frame 300. The insulation cover 800 may be located on the inner surface of the end plate 400 and may be attached to the inner surface of the end plate 400, but this is not necessarily the case.

The end plate 400 may be formed in two numbers, and may include a first end plate located on the front surface of the battery cell stack 120 and a second end plate located on the rear surface of the battery cell stack 120.

The first end plate may be coupled to the module frame 200 while covering the first busbar frame on the front surface of the battery cell stack 120, and the second end plate may be coupled to the module frame 200 while covering the second busbar frame.

The busbars 510 and 520 may be mounted on one surface of the busbar frame 300 and may be for electrically connecting the battery cell stack 120 or the battery cells 110 and an external device circuit. The busbars 510 and 520 are located between the battery cell stack 120 or the busbar frame 300 and the end plate 400, whereby they can be protected from external impacts and the like, and deterioration of durability can be minimized due to external moisture and the like.

The busbars 510 and 520 can be electrically connected to the battery cell stack 120 through the electrode leads 111 and 112 of the battery cells 110. Specifically, the electrode leads 111 and 112 of the battery cells 110 pass through a slit formed in the busbar frame 300 and then are bent to be connected (joined or coupled) to the busbars 510 and 520. The method of joining the electrode leads 111 and 112 to the busbars 510 and 520 is not particularly limited, but weld-joining can be applied as an example. The battery cells 110 constituting the battery cell stack 120 may be connected in series or in parallel by the busbars 510 and 520.

The busbars 510 and 520 may include a terminal busbar 520 for electrically connecting one battery module 100 to another battery module 100. At least a part of the terminal busbar 520 may be exposed to the outside of the end plate 400 in order to be connected with another external battery module 100, and the end plate 400 may be provided with a terminal busbar opening 400H for this purpose. Further, the insulation cover 800 coupled to the end plate 400 may also have a second terminal busbar opening 800H corresponding thereto.

The terminal busbar 520 may further include a protrusion that is protruded upward, unlike other busbars 510, and the protrusion may be exposed to the outside of the battery module 100 via a terminal busbar opening 400H. The terminal busbar 520 may be connected with another battery module 100 or a BDU (Battery Disconnect Unit) via a protrusion exposed through the terminal busbar opening 400H, and may form a high voltage (HV) connection with them. Here, the HV connection is a connection that serves as a power source for supplying power, and means a connection between the battery cells 110 or a connection between the battery modules 100.

The module connector 610 and the sensing unit 700 may detect and control phenomena such as overvoltage, overcurrent, and overheating of the battery cell 110. The module connector 610 and the sensing unit 700 are for low voltage (LV) connection, wherein the LV connection may mean a sensing connection for sensing and controlling the voltage of the battery cell. Voltage information and temperature information of the battery cell 110 can be transmitted to an external BMS (Battery Management System) via the module connector 610 and the sensing unit 700.

The module connector 610 may transmit the collected data to an external control device and receive a signal from the external control device. The module connector 610 may transmit data obtained from the temperature sensor 730 and/or the sensing terminal 720 to a BMS (Battery Management System), and the BMS may control charging and discharging of the battery cells 110 based on the collected voltage data.

The module connector 610 may be mounted on the busbar frame 300 described above. The module connector 610 may be connected to the holder 302 of the busbar frame 300. At least a part of the module connector 610 may be exposed to the outside of the end plate 400, and the end plate 400 may be provided with a module connector opening 400L for that purpose. A second module connector opening 800L corresponding thereto may also be provided in the insulation cover 800 coupled to the end plate 400.

The sensing unit 700 may include a sensing terminal 720 for sensing voltage values of the busbars 510 and 520, a temperature sensor 730 for sensing a temperature inside the battery module 100, and a connection member 710 connecting them.

Here, the connection member 710 may be disposed in a form extending along the longitudinal direction from the upper surface of the battery cell stack 120. The connection member may be a flexible printed circuit board (FPCB) or a flexible flat cable (FFC).

Meanwhile, as described above, an ignition phenomenon may occur inside the battery module 100 in which the battery cells 110 are stacked at a high density. When an ignition phenomenon occurs in one battery module 100, gas or the like is discharged through the openings 400H and 400L provided in the end plate, thereby damaging the terminal busbar 520 or the like, and heat, gas, or flame of the battery module 100 are transferred to the battery module 100 adjacent thereto, thereby occurring a continuous firing phenomenon.

FIGS. 7 to 9 are diagrams for explaining an example of a gasket included in a battery module according to an embodiment of the present disclosure.

The dimension of the terminal busbar opening 400H is mainly determined by the periphery of the terminal busbar 520, but for ease of assembly or for manufacturing process reasons, the size of the terminal busbar opening 400H may be larger than the cross-sectional size of the terminal busbar 520. Gas, sparks, flames, etc. may be discharged to the outside through such a gap. Moreover, if the busbar frame 300 and the end plate 400 around the terminal busbar 520 protruding to the outside of the battery module 100 are not completely in close contact with each other, gas or the like is concentrated on this gap space at the internal ignition of the battery module 100, which causes a problem that gas discharge through the terminal busbar opening 400H is promoted. However, the gasket 900 of the present embodiment may form a seal around the terminal busbar 520, whereby gas discharge through the terminal busbar opening 400H can be minimized. Here, 'gap space' and 'gap' herein may be understood to be distinct from each other, but may be collectively referred to as the general word 'gap' in a broad category.

Meanwhile, in describing the relationship between the end plate 400 and other members in the present disclosure, the end plate 400 may be interpreted as including the insulation cover 800 or other members attached/coupled to the inner surface of the end plate 400. For example, the gap between the terminal busbar opening 400H and the terminal busbar 520 may be interpreted as a gap between the second terminal busbar opening 800H and the terminal busbar 520. As another example, the gap space between the busbar frame 300 and the end plate 400 around the terminal busbar 520 may be interpreted as a gap space between the busbar frame 300 and the insulation cover 800.

Referring to FIGS. 7 to 9, the gasket 900 of the present embodiment may form a seal between the terminal busbar 520 and the terminal busbar opening 400H. The gasket 900 can seal a gap between the protrusion of the terminal busbar 520 and the terminal busbar opening 400H. The gasket 900 may form a seal between the busbar frame 300 and the end plate 400 around the terminal busbar opening 400H. The gasket 900 may seal the gap space around the terminal busbar 520.

The gasket 900 may be fitted to the terminal busbar 520 before assembling the end plate 400. One end of the terminal busbar 520 may protrude by passing the gasket 900 through the gasket hole 910.

The gasket 900 may include a gasket hole 910 into which the terminal busbar 520 can be inserted, a lip part 920 formed around the gasket hole 910, and a contact part 930 extending from the gasket hole 910.

The lip part 920 of the gasket 900 may be in close contact with the protrusion of the terminal busbar 520. The lip part 920 may be a portion extending from the periphery of the gasket hole 910 in the protrusion direction (x-axis direction) of the terminal busbar 520. The lip part 920 may be a portion having a step in the gasket 900. Referring to FIG. 9, or FIGS. 13 and 14 described later, the terminal busbar 520 is located inside the lip part 920, and the terminal busbar opening 400H or the inside of the hole may be located outside the lip part 920. The inner surface of the lip part 920 is in close contact with the periphery of the terminal busbar 520, and the outer surface of the lip part 920 may be in close contact with the terminal busbar opening 400H or the inside of the opening. Through this, a gap between the terminal busbar 520 and the terminal busbar opening 400H may be filled by a gasket 900. The gasket 900 may prevent gas from being discharged through the terminal busbar opening 400H. The relative movement of the protrusion of the terminal busbar 520 and the terminal busbar opening 400H can be prevented by the gasket 900, and the two parts may not collide with each other by an external force.

The contact part 930 of the gasket 900 may be a portion that radially expands or extends from the periphery of the gasket hole 910. The contact part 930 includes a first contact surface 932 in contact with the outer surface of the busbar frame 300 in the periphery of the terminal busbar 520 and a second contact surface 934 in contact with the inner surface of the end plate 400. Here, the inner surface or the outer surface may be described as a surface facing the inside or a surface facing the outside of the battery module 100 in each member. Further, as described above, the contact with the end plate 400 may mean the contact with a member (e.g., the insulation cover 800) attached to the end plate 400.

As shown in FIG. 9, or FIGS. 13 and 14 described later, the contact part 930 may be located between the busbar frame 300 and the end plate 400, and the gap between the two members can be filled. As gas or the like moves along the gap space, the gasket 900 can prevent gas from being discharged through the terminal busbar opening 400H. The busbar frame 300 and the end plate 400 may be fixed to each other by the gasket 900 and supported by each other. Further, even if the lip portion 920 and the terminal busbar opening 400H are slightly separated from each other depending on the thickness of the lip part 920, the contact part 930 may fill the separated space. Therefore, a seal may be more completely formed between the terminal busbar 520 and the terminal busbar opening 400H by the contact part 930.

The gasket 900 may be an elastic body. The gasket 900 may cover the slightly variable gap or the gap space by being partially compressed by an external force. Further, since the gasket 900, which is an elastic body, can be compressed even if it is designed to be slightly larger than the normal size that the gasket 900 should cover, and thus its size can be adjusted. The gasket 900 may be provided with a heat-resistant or flame-retardant material, which may be for being not damaged by the charging/discharging or thermal runaway phenomenon of the battery cell 110. Specifically, the gasket 900 may be provided with a flame retardant foam, resin, silicone, rubber, or other similar material.

Meanwhile, depending on the size of the battery cell 110, or the increase in internal pressure due to internal ignition of the battery module 100, a compressive force in the longitudinal direction (x-axis) of the battery cell stack 120 may act on the gasket 900. In the gasket of this embodiment, a 'protrusion' that can effectively cope with such a compressive force may be formed. Here, the protrusion may be referred to as an embossed part, a raised part, a protruded part, or the like.

FIG. 10 is a diagram of another example of a gasket included in a battery module according to an embodiment of the present disclosure. FIGS. 11 and 12 are diagrams for explaining the coupling of the gasket and the busbar of FIG. 10. FIGS. 13 and 14 are diagrams for explaining the coupling of the gasket and the end plate of FIG. 10.

Meanwhile, the gasket 900 described below may be described as including all of the contents of FIGS. 7 to 9 in addition to including the protrusion 940. Therefore, detailed description of the contents overlapping with the above will be omitted.

The protrusion 940 may effectively cope with a compressive force acting in the longitudinal direction (x-axis) of the battery cell stack 120. As described above, since the gasket 900 may be provided as an elastic body, it can cope slightly to the compressive force. However, when a large internal pressure occurs, such as during charging/discharging or thermal runaway of the battery cell 110, it may not be able to effectively seal the periphery of the protrusion of the terminal busbar 520 due to physical or chemical deformation. Therefore, it may be preferable that the gasket 900 is provided with a protrusion 940. The gasket 900 includes the protrusion 940, so that compressibility can be improved, and even during internal ignition, it is possible to effectively seal the periphery of the protrusion of the terminal busbar 520.

Referring to FIGS. 10 to 12, the protrusion 940 may be a portion protruding from the first contact surface 932 or the second contact surface 934 of the contact part 930. The protrusion 940 may be a portion protruding from the contact part 930 toward the inside or outside of the battery module 100. Since the protrusion 940 is partially compressible in response to the above-mentioned compressive force, it is possible to partially absorb an external force transmitted to the end plate 400 due to an increase in internal pressure. Further, referring to FIGS. 13 and 14, the gap space between the busbar frame 300 and the end plate 400, that is, the separation distance between the two members may be larger than the thickness of the contact part 930. However, since the protrusion 940 protrudes from one surface of the contact part 930 to come into contact with the busbar frame 300 or the end plate 400, it is possible to compensate such difference in dimension. Here, the protrusion 940 may be formed on both the first contact surface 932 and the second contact surface 934 of the contact part 930, but it is also possible to be formed on only one of the two surfaces of the contact part 930. Further, the heights of the protrusions 940 formed on each surface of the contact part 930 may be different from each other. Further, as described above, the contact with the end plate 400 may mean the contact with a member (e.g., the insulation cover 800) attached to the end plate 400.

The protrusion 940 may be provided in a shape including a plurality of shapes that are radially spaced apart from each other around the gasket hole 910. That is, the protrusions 940 may be provided in a concentric graphic pattern. Each of the protrusions 940 may be located at regular intervals, which can be for evenly covering the first contact surface 932 and the second contact surface 934 of the contact part 930. Since the shape of the protrusion 940 is not limited by the above-mentioned figures, the shape of the protrusion 940 may be different from that illustrated.

The heights (the x-axis direction in reference to FIG. 10) of the protrusions included in the protrusion 940 may be constant, or may be different from each other. For example, the height of the protrusions may be constant, and the value may be within 1 mm. Specifically, considering the distance between the gasket 900 and the busbar frame 300 or the end plate 400, it may be desirable to be within 0.1 to 0.5 mm. In another example, the height of the protrusions may be gradually increased or decreased as it goes far away from the gasket hole 910. That is, the protrusion 940 may be provided so that a cross-section thereof has a step shape. At this time, when the gasket hole 910 is formed such that the height thereof is gradually lowered, a dimensional difference occurring around the terminal busbar opening 400H may be more effectively compensated.

Meanwhile, in the end plate 400 of the battery module 100 described above, a terminal busbar opening 400H may also be formed in addition to the module connector opening 400L. Therefore, even if the terminal busbar opening 400H is sealed by the gasket 900, gas, sparks, flames or the like are discharged to the module connector opening 400L at the time of internal ignition of the battery module 100, thereby causing a continuous thermal runaway phenomenon.

FIG. 15 is a diagram for explaining a coupling structure of a module connector included in a conventional battery module.

Referring to FIG. 15, the conventional battery module 10 may be provided with a module connector 60 connected to the sensing unit 70. The module connector 60 may be disposed between the busbar frame 30 and the end plate 40 in the completed battery module 10. Here, a connector gasket 62 for sealing a gap between the opening formed in the end plate 40 and the module connector 60 may be provided around the module connector 60.

However, since the connector gasket 62 provided in the conventional battery module 10 has a narrow width, it is difficult to secure a wide airtight surface B1 between the end plate 40 and the module connector 60. Further, depending on the size difference B2 of the battery cell 11, the connector gasket 62 may be compressed in the longitudinal direction of the battery cell 11 during the assembly process, but there may be a problem that the range allowed by the connector gasket 62 is narrow.

Therefore, in the following, the connector assembly 600 that can more stably mount the module connector inside the battery module, widely form an airtight surface with the end plate, and flexibly cope with the difference in dimensions of the battery cell, and the like will be described.

Next, a battery module according to another embodiment of the present disclosure will be described.

FIG. 16 is a perspective view showing a battery module according to another embodiment of the present disclosure. FIG. 17 is a perspective view of a connector assembly included in a battery module according to another embodiment of the present disclosure. FIG. 18 is a diagram of a sealing member included in the connector assembly of FIG. 17. FIG. 19 is a diagram for explaining the coupling of the connector assembly and the sensing unit included in the battery module according to an embodiment of the present disclosure. FIG. 20 is a cross-sectional view taken along the line C-C of FIG. 19. Here, FIG. 16 shows the battery module in which the end plate is omitted.

Meanwhile, the battery module 100 of FIG. 16 may be described as including all the contents of FIGS. 3 to 14 described above in addition to including the connector assembly 600. Therefore, detailed description of the contents overlapping with the above will be omitted.

Referring to FIGS. 16 to 20, the connector assembly 600 according to the present embodiment may include a module connector 610 and a housing 620. The role and function of the module connector 610 will be referred to the above description, and the housing 620 will be mainly described below.

The housing 620 can protect the module connector 610 from external influences. The outer surface of the module connector 610 may be blocked from external moisture or external air by the housing 620. The housing 620 may surround the module connector 610. The housing 620 may be an injection molded product manufactured by applying an over-molding process on the module connector 610. The housing 620 may be integrated with the module connector 610. The housing 620 may be integrated with the module connector 610 to form the connector assembly 600.

The housing 620 can be for sealing a gap between the module connector 610 and the module connector opening 400L of the end plate 400. For the ease of assembly or for manufacturing process reasons, the size of the module connector opening 400L may be larger than the size of the exposed portion of the module connector 610. When the battery module 100 internally ignites, gas, sparks, flames, and the like may be discharged to the outside through this gap. The housing 620 may have an upper surface that wraps the periphery of the module connector 610 and extends from the periphery of the exposed part of the module connector 610. Since the upper surface of the housing 620 is formed so as to correspond to the inner surface of the end plate 400, the gap between the module connector opening 400L and the module connector 610 may be filled, buried or hidden in the housing 620. In this case, the area of the upper surface of the connector assembly 600 may be larger than the area of the module connector opening 400L.

The housing 620 may be for widely forming an airtight surface between the module connector 610 and the end plate 400. Since the housing 620 is formed so as to correspond to the inner surface of the end plate 400, the module connector 610 may come into contact with the end plate 400 and the like on a wide surface through the housing 620, or may be located close thereto. Therefore, the housing 620 of the present embodiment can widely form an airtight surface between the module connector 610 and the end plate 400 when the conventional connector gasket 62 having a narrow width is used. The connector assembly 600 may be stably coupled, fixed, and supported with the end plate 400 via the housing 620.

In this case, the surface of the housing 620 in contact with or close to the end plate 400 may be referred to as a corresponding surface. Specifically, as shown in FIG. 20, the connector assembly 600 may have a stepped cross-section, and one surface of the housing 620 forming a step shape, for example, the upper surface confirmed when the housing 620 is viewed from above (on the z-axis) or the front surface that is confirmed when the housing 620 is viewed from the front (on the x-axis) is the battery may be in contact with the end plate 400 or may be located close thereto in the completed body of the battery module 100. In this manner, the corresponding surface of the housing 620 may be interpreted as including at least a part of one surface of the housing 620 forming a step shape. Additionally, these corresponding surfaces can be confirmed in more detail with reference to FIG. 25, which will be described later.

The housing 620 may be for coupling (or mounting) the module connector 610 to the inside of the battery module 100. The housing 620 may be for connecting the module connector 610 to the busbar frame 300 and the end plate 400. The housing 620 may be for locating the module connector 610 between the busbar frame 300 and the end plate 400. The housing 620 may be mounted to the busbar frame 300 via a slot 622, and may be coupled to the end plate 400 via a coupling hole 624. Detailed description of the slot 622 and the coupling hole 624 will be given later with reference to FIGS. 21 to 25.

Meanwhile, the housing 620 is formed so as to cover at least a part of the module connector opening 400L of the end plate 400, and can be provided in a shape corresponding to the inner surface of the end plate 400. However, due to various reasons in the manufacturing process, the detailed dimensions appearing in the final product may differ from the designed ones, whereby a gap space may be formed between the housing 620 and the end plate 400 after assembly. This gap space can generate a flow between the housing 620 and the end plate 400, and there is a risk of reducing the sealing properties of the housing 620 and the end plate 400. Therefore, the sealing member 630 for improving the sealing property between the housing 620 and the end plate 400 can be provided in the connector assembly 600 of the present embodiment. Here, the connector assembly 600 may be described as including a sealing member 630.

The sealing member 630 may form a seal between the housing 620 and the end plate 400. The sealing member 630 may fill a gap between the housing 620 and the end plate 400 by making contact with the housing 620 and the end plate 400. The sealing member 630 can generate a gap space between the housing 620 and the end plate 400 in the completed body of the battery module 100, thereby preventing the two members from moving relative to each other. The housing 620 and the end plate 400 may be fixed to each other by the sealing member 630 and supported by each other. Further, the sealing member 630 may prevent gas from being discharged through the openings 400L and 400H formed in the end plate 400 by moving gas or the like along the gap space.

The sealing member 630 may be disposed on a corresponding surface of the housing 620. At least a part of the sealing member 630 may protrude from the corresponding surface of the housing 620. This may be for the sealing member 630 located on one surface of the housing 620 to come into contact with the end plate 400. This is because the sealing member 630 located on one surface of the housing 620 is pressed by the end plate 400 so that the housing 620 and the end plate 400 can be fixed to each other. The sealing member 630 may be disposed at a distance from the terminal of the module connector 610. This may take into account the corresponding surface of the housing 620 that extends widely around the terminal of the module connector 610. Further, the housing 620 may be provided with a groove for arranging the sealing member 630 in a fixed position, and the position of the sealing member 630 may be fixed by a groove formed in the housing 620.

Referring to FIG. 18, the sealing member 630 may have a linear shape or a band shape. Specifically, the sealing member 630 may be in the form of a closed curve in which both terminal ends are connected. When the sealing member 630 has a closed curve shape, the overall shape of the sealing member 630 is not deformed, so assembly or design may be easy. However, since the shape of the sealing member 630 is not limited by the above figures, it would be obvious that the sealing member 630 may be provided in various shapes, such as a planar shape.

The sealing member 630 is shown to have a slightly rectangular shape in the front view of FIG. 18 (*c*) in which perspective on the x-axis is ignored, but as shown in the side view of FIG. 18 (*b*), it may have a stepped shape by traversing a predetermined section on the x-axis. This may correspond to the cross-sectional shape of the corresponding surface of the housing 620 described above.

The sealing member 630 may be an elastic body. The sealing member 630 may cover a gap space between the slightly variable housing 620 and the end plate 400 by being partially compressed by an external force. Also, even if the sealing member 630 is designed to be slightly larger than the size of a typical gap space, its size may be adjusted through compression. Here, the size may mean thickness or height (x-axis direction as a reference in FIG. 18). The sealing member 630 may be provided with a heat-resistant or flame-retardant material, which may be in order not to be damaged by the charging/discharging or thermal runaway phenomenon of the battery cell 110. Specifically, the sealing member 630 may be provided with a flame-retardant foam, resin, silicone, rubber, or other similar material.

Meanwhile, referring to FIGS. 19 and 20, the above-mentioned connector assembly 600 may be coupled to the sensing unit 700. The method for coupling the connector assembly 600 and the sensing unit 700 is not particularly limited, but a weld-joining such as soldering can be applied as an example.

Next, the coupling between the connector assembly 600 and the busbar frame 300 will be described.

FIGS. 21 to 23 are diagrams for explaining the coupling of a connector assembly and a busbar frame included in a battery module according to another embodiment of the present disclosure.

Referring to FIGS. 21 to 23, the housing 620 may include a slot 622 that forms a coupling between the module connector 610 and the busbar frame 300. Typically, a ring-shaped holder hole 612 may be formed in the module connector 610, and the holder 302 of the busbar frame 300 may be inserted into the holder hole 612, so that the module connector 610 and the busbar frame 300 can be coupled to each other. The holder 302 may be in the form of a rod protruding from one surface of the busbar frame 300.

The slot 622 may be in the form of a hole passing through the housing 620, and the opening of the slot 622 may correspond to the opening of the holder hole 612. The holder 302 may be inserted into the slot 622 corresponding to the holder hole 612, through which the housing 620 and the busbar frame 300 can be coupled. Here, since the holder 302 is movable along the hole inside the slot of the housing 620, the connector assembly 600 can be slidably coupled to the busbar frame 300.

The connector assembly 600 and the busbar frame 300 are slidably coupled by the slot 622, whereby a relative distance between the connector assembly 600 and the busbar frame 300 can be adjusted. Specifically, when a compressive force is applied in the longitudinal direction (x-axis direction) from the battery cells 110 due to a size difference of the battery cells 110 or the like, the connector assembly 600 can be appropriately moved from the busbar frame 300 according to its compressive force.

The connector assembly 600 may be movable in one direction with respect to the busbar frame 300 by the slot 622. Specifically, the holder 302 is located inside the slot 622, and the connector assembly 600 is moved in the longitudinal direction (x-axis direction) of the battery cell stack 120 along the length of the holder 302, whereby it is possible to prevent flowing up and down (z-axis) or left-right (y-axis) direction of the connector assembly 600 with respect to the busbar frame 300 by the slot 622.

Meanwhile, unlike the one shown in FIG. 6, the busbar frame 300 of the present embodiment may not include the support 304.

Further, unlike the one shown in FIG. 6, the terminal end of the holder 302 may be designed so as to have a larger diameter than other parts, through which it is possible to prevent the mounting hole 612 from being separated from the holder 302. Here, based on the axial cross-section of the holder 302, the terminal end of the holder 302 may have a convex shape or a dome shape. Further, the terminal end of the holder 302 herein may have a tapering shape that becomes narrower as it approaches the terminal end.

At least a part of the terminal end of the holder 302 may be separated. The terminal end of the holder 302 may include two parts cut axially, and the two parts may be located in a form in which axial cross-sections face each other. This may be for adjusting the diameter of the terminal end of the holder 302 by spaced apart or abutting between the two separated parts. When the diameter of the terminal end of the holder 302 is adjusted, the terminal end of the holder 302 having a relatively large diameter may not prevent the holder 302 from being inserted into the holder hole 612. Further, when the holder 302 is inserted into the holder hole 612 and the two parts are separated, the diameter of the terminal end of the holder 302 may increase. Thus, the terminal ends of the holder hole 612 and the holder 302 can be easily abutted each other, through which the disengagement between the two members can be prevented because the terminal end of the holder hole 612 and the holder 302 are in contact with each other. The terminal end of the holder 302 herein may be referred to as a 'terminal end', and the two axially cut portions may be referred to as a first terminal end and a second terminal end.

Referring to FIG. 23, when the terminal end of the holder 302 has two separate parts, the terminal end of the holder 302 may be adjusted according to the size of the inner diameter of the slot 622. A diameter of at least partial section of the slots 622 may be larger than an opening diameter of the holder hole 612. A diameter of at least partial section of the slots 622 may be larger than a diameter of an inner peripheral surface of the holder hole 612. A diameter of at least partial section of the slots 622 may be larger than a diameter of an outer peripheral surface of the holder hole 612. For example, if the diameter of the first section of the slot 622 is larger than the diameter of the opening of the holder hole 612, the two ends of the terminal end of the axially cut holder 302 in the first section may be widened, whereby the rear surface of the terminal end of the holder 302 may easily abut on the holder hole 612. Here, the first section may be a section close to the holder hole 612 in the slot 622. Further, here, the terminal end of the holder 302 has a tapering shape that becomes narrower as it approaches the terminal end, which may not be difficult to leave the first section and enter the second section having a relatively narrow diameter inside the slot 622. At this time, it may be preferable that the second section be located outside the first section, that is, in a direction toward the outside of the battery module 100 or in a direction in which the end plate 400 is located.

Next, the coupling between the connector assembly 600 and the end plate 400 will be described.

FIGS. 24 and 25 are diagrams for explaining the coupling of the connector assembly and the end plate included in the battery module according to an embodiment of the present disclosure.

Referring to FIGS. 24 and 25, the housing 620 may include a coupling hole 624 for coupling between the module connector 610 and the end plate 400.

The coupling hole 624 may be formed on the coupling surface of the housing 620. Here, the coupling surface may refer to a surface extending in the up-down (z-axis) direction from the body portion for housing the module connector 610 in the housing 620. The coupling surface may be a surface perpendicular to the longitudinal direction (x-axis) direction of the battery cell stack 120. The coupling surface may be a surface corresponding to the end plate 400. The coupling surface may be a surface in contact with the end plate 400. Here, as described above, the contact with the end plate 400 may mean the contact with a member (e.g., the insulation cover 800) attached to the end plate 400.

The coupling hole 624 may be one or more, preferably two or more or four or more. As shown in FIG. 17, the coupling hole 624 may be located close to each vertex on the front surface of the housing 620. The coupling holes 624 can be formed at all sides of the housing 620, thereby stably fixing the housing 620.

The end plate 400 may be formed with an end plate coupling hole 404. Based on the completed battery module 100, the position of the end plate coupling hole 404 in the end plate 400 may correspond to the position of the coupling hole 624 of the housing 620. The fastening member 440 may be inserted into the end plate coupling hole 404 from the outer surface of the end plate 400. When the fastening member 440 is inserted into the coupling hole 624, the end plate 400 and the housing 620 can be fixed. Here, the outer surface of the end plate 400 may be a surface facing the outside of the battery module 100 from the end plate 400. Further, the fastening member 440 herein may be a bolt, screw, or other member.

Depending on the order in which the fastening member 440 is inserted, the end plate coupling hole 404 may be referred to as a first fastening hole, and the coupling hole 624 may be referred to as a second fastening hole. Further, the above-mentioned end plate coupling hole 404 and/or coupling hole 624 may be formed in advance before assembly of the battery module 100, but may be formed by insertion of the fastening member 440 during the assembly process. Further, the above-mentioned end plate coupling hole 404 and/or coupling hole 624 may be provided with female threads or grooves corresponding to the male threads of the fastening member 440, but this is not necessarily the case.

Meanwhile, the above-mentioned battery module 100 can be included in the battery pack. The battery pack may have a structure in which one or more of the battery modules according to the embodiment of the present disclosure are gathered, and packed together with a battery management system (BMS) and a cooling device that control and manage battery's temperature, voltage, etc.

The above-mentioned battery module and the battery pack including the same can be applied to various devices. Such a device may be applied to a vehicle means such as an electric bicycle, an electric vehicle, or a hybrid vehicle, but the present disclosure is not limited thereto, and is applicable to various devices that can use a battery module and a battery pack including the same, which also falls under the scope of the present disclosure.

Although the invention has been shown and described with reference to the preferred embodiments, the scope of the present disclosure is not limited thereto, and numerous changes and modifications can be devised by those skilled in the art using the principles of the invention defined in the appended claims, which also falls within the spirit and scope of the present disclosure.

DESCRIPTION OF REFERENCE NUMERALS

100: battery module
110: battery cell
111, 112: electrode lead
120: battery cell stack
200: module frame
300: busbar frame
302: holder
306: slit
330: upper cover

336: locking part
400: end plate
400H: terminal busbar opening
400L: module connector opening
404: connector housing fastening hole
440: fastening member
510: busbar
520: terminal busbar
600: connector assembly
610: module connector
612: holder hole
620: housing
622: slot
624: coupling hole
630: sealing member
700: sensing unit
710: connection member
720: sensing terminal
730: temperature sensor
800: insulation cover
900: gasket
910: gasket hole
920: lip part
930: contact part
940: protrusion

The invention claimed is:

1. A battery module comprising:

a battery cell stack in which a plurality of battery cells are stacked in a first direction, a module frame that houses the battery cell stack, a busbar that electrically connects the battery cell stack and an external member, a busbar frame that covers a front surface or a rear surface of the battery cell stack and to which the busbar is attached, and an end plate that is coupled to the module frame and covers the busbar frame, wherein at least one opening is formed in the end plate, wherein a busbar protrusion is exposed to the outside through the at least one opening, wherein a gap between the busbar protrusion and the at least one opening is closed by a gasket, wherein the gasket comprises a gasket hole into which the busbar protrusion is inserted, and a contact part extending outwardly from a periphery of the gasket hole, wherein the contact part comprises a first contact surface facing an inside of the battery module, the first contact surface contacting an outer surface of the busbar frame, and wherein the first contact surface is formed with a first protrusion.

2. The battery module of claim 1, further comprising:

a lip part extending from a periphery of the gasket hole toward an exposure direction of the busbar protrusion.

3. The battery module of claim 2, wherein:

an inner surface of the lip part contacts an outer periphery of the busbar protrusion, and an outer surface of the lip part contacts the at least one opening.

4. The battery module of claim 1, wherein:

the contact part further comprises a second contact surface facing an outside of the battery module.

5. The battery module of claim 4, wherein:

the second contact surface is formed with a second protrusion.

6. The battery module of claim 5, wherein:

the first protrusion is a portion that protrudes from the first contact surface toward the inside of the battery module and the second protrusion is a portion that protrudes from the second contact surface toward the outside of the battery module.

7. The battery module of claim 5, wherein:

at least one of the first protrusion and the second protrusion has a concentric graphic pattern including a plurality of graphics radially separated from the gasket hole.

8. The battery module of claim 5, wherein:

a height of at least one of the first protrusion and the second protrusion is constant.

9. The battery module of claim 5, wherein:

a height of at least one of the first protrusion and the second protrusion gradually decreases in a direction extending away from the gasket hole.

10. The battery module of claim 1, the battery module further comprises a module connector mounted on the busbar frame.

11. The battery module of claim 10, wherein:

the busbar frame includes a holder, and the module connector is connected to the holder of the busbar frame.

12. A battery pack comprising at least one battery module as set forth in claim 1.

* * * * *